US011106467B2

(12) United States Patent
Smith et al.

(10) Patent No.: US 11,106,467 B2
(45) Date of Patent: Aug. 31, 2021

(54) INCREMENTAL SCHEDULER FOR OUT-OF-ORDER BLOCK ISA PROCESSORS

(71) Applicant: Microsoft Technology Licensing, LLC, Redmond, WA (US)

(72) Inventors: Aaron L. Smith, Seattle, WA (US); Jan S. Gray, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 172 days.

(21) Appl. No.: 15/224,473

(22) Filed: Jul. 29, 2016

(65) Prior Publication Data

US 2017/0315813 A1    Nov. 2, 2017

Related U.S. Application Data

(60) Provisional application No. 62/328,976, filed on Apr. 28, 2016.

(51) Int. Cl.
*G06F 9/38* (2018.01)
*G06F 9/30* (2018.01)
(Continued)

(52) U.S. Cl.
CPC .......... *G06F 9/3836* (2013.01); *G06F 9/3005* (2013.01); *G06F 9/3016* (2013.01);
(Continued)

(58) Field of Classification Search
None
See application file for complete search history.

(56) References Cited

U.S. PATENT DOCUMENTS

| 4,638,454 A | 1/1987 | Waterworth |
| 4,814,978 A | 3/1989 | Dennis |

(Continued)

FOREIGN PATENT DOCUMENTS

| EP | 0 410 105 A2 | 1/1991 |
| NL | 9100598 | 11/1992 |

(Continued)

OTHER PUBLICATIONS

A. Johri, "Implementation of instruction scheduler on FPGA," Master's thesis, University of Tokyo, Mar. 24, 2011, pp. 1-50. (Year: 2011).*

(Continued)

*Primary Examiner* — John M Lindlof
(74) *Attorney, Agent, or Firm* — Klarquist Sparkman, LLP

(57) ABSTRACT

Apparatus and methods are disclosed for implementing incremental schedulers for out-of-order block-based processors, including field programmable gate array implementations. In one example of the disclosed technology, a processor includes an instruction scheduler formed by configuring one or more look up table RAMs to store ready state data for a plurality of instructions in an instruction block. The instruction scheduler further includes a plurality of queues that store ready state data for the processor and sends dependency information to ready determination logic on a first in/first out basis. The instruction scheduler selects one or more of the ready instructions to be issued and executed by the block-based processor.

15 Claims, 18 Drawing Sheets

(51) Int. Cl.
*G06F 15/78* (2006.01)
*G06F 12/0875* (2016.01)

(52) U.S. Cl.
CPC ........ *G06F 9/3017* (2013.01); *G06F 9/30181* (2013.01); *G06F 9/30185* (2013.01); *G06F 9/3802* (2013.01); *G06F 9/3818* (2013.01); *G06F 9/3834* (2013.01); *G06F 9/3838* (2013.01); *G06F 9/3855* (2013.01); *G06F 9/3873* (2013.01); *G06F 9/3885* (2013.01); *G06F 9/3889* (2013.01); *G06F 9/3897* (2013.01); *G06F 12/0875* (2013.01); *G06F 15/7867* (2013.01)

(56) References Cited

U.S. PATENT DOCUMENTS

| | | |
|---|---|---|
| 5,067,110 A | 11/1991 | Runaldue |
| 5,185,869 A | 2/1993 | Suzuki |
| 5,197,137 A | 3/1993 | Kumar et al. |
| 5,212,663 A | 5/1993 | Leong |
| 5,241,635 A | 8/1993 | Papadopoulos et al. |
| 5,276,819 A | 1/1994 | Rau et al. |
| 5,373,466 A | 12/1994 | Landeta et al. |
| 5,541,850 A | 7/1996 | Vander Zanden et al. |
| 5,546,597 A | 8/1996 | Martell et al. |
| 5,572,535 A | 11/1996 | Pixley et al. |
| 5,615,350 A | 3/1997 | Hesson |
| 5,748,978 A | 5/1998 | Narayan et al. |
| 5,790,822 A | 8/1998 | Sheaffer et al. |
| 5,796,997 A | 8/1998 | Lesartre et al. |
| 5,845,103 A | 12/1998 | Sodani et al. |
| 5,943,501 A | 8/1999 | Burger et al. |
| 6,016,399 A | 1/2000 | Chang |
| 6,035,374 A | 3/2000 | Panwar et al. |
| 6,052,773 A | 4/2000 | DeHon et al. |
| 6,061,776 A | 5/2000 | Burger et al. |
| 6,101,597 A | 8/2000 | Colwell et al. |
| 6,105,128 A | 8/2000 | Hathaway et al. |
| 6,161,170 A | 12/2000 | Burger et al. |
| 6,164,841 A | 12/2000 | Mattson et al. |
| 6,192,447 B1 | 2/2001 | Shand |
| 6,223,254 B1 | 4/2001 | Soni |
| 6,266,768 B1 | 7/2001 | Frederick, Jr. et al. |
| 6,282,583 B1 | 8/2001 | Pincus et al. |
| 6,338,129 B1 | 1/2002 | Pechanek et al. |
| 6,470,443 B1 | 10/2002 | Emer et al. |
| 6,493,820 B2 | 12/2002 | Akkary et al. |
| 6,529,922 B1 | 3/2003 | Hoge |
| 6,553,480 B1 | 4/2003 | Cheong et al. |
| 6,836,420 B1 | 2/2004 | Seshadri et al. |
| 6,721,884 B1 | 4/2004 | De Oliveira Kastrup Pereira et al. |
| 6,918,032 B1 | 7/2005 | Abdallah et al. |
| 6,965,969 B2 | 11/2005 | Burger et al. |
| 6,988,183 B1 | 1/2006 | Wong |
| 7,032,217 B2 | 4/2006 | Wu |
| 7,107,553 B2 | 9/2006 | Lockyear et al. |
| 7,130,990 B2 | 10/2006 | Brekelbaum |
| 7,188,232 B1 | 3/2007 | Choquette |
| 7,299,458 B2 | 11/2007 | Hammes |
| 7,302,527 B2 | 11/2007 | Barrick et al. |
| 7,380,038 B2 | 5/2008 | Gray |
| 7,676,650 B2 | 3/2010 | Ukai |
| 7,721,066 B2 | 5/2010 | Yeh et al. |
| 7,739,482 B2 | 6/2010 | Nguyen et al. |
| 7,836,282 B2 | 11/2010 | Ban et al. |
| 7,853,777 B2 | 12/2010 | Jones et al. |
| 7,877,580 B2 | 1/2011 | Eickemeyer et al. |
| 7,917,733 B2 | 3/2011 | Kazuma |
| 8,006,074 B1 | 8/2011 | Miranda et al. |
| 8,006,075 B2 | 8/2011 | Luttrell |
| 8,032,734 B2 | 10/2011 | Svendsen et al. |
| 8,055,881 B2 | 11/2011 | Burger et al. |
| 8,055,885 B2 | 11/2011 | Nakashima |
| 8,099,566 B2 | 1/2012 | Luttrell |
| 8,127,119 B2 | 2/2012 | Burger et al. |
| 8,180,997 B2 | 5/2012 | Burger et al. |
| 8,201,024 B2 | 6/2012 | Burger et al. |
| 8,250,555 B1 | 8/2012 | Lee et al. |
| 8,321,850 B2 | 11/2012 | Bruening et al. |
| 8,429,386 B2 | 4/2013 | Jordan et al. |
| 8,433,885 B2 | 4/2013 | Burger et al. |
| 8,447,911 B2 | 5/2013 | Burger et al. |
| 8,464,002 B2 | 6/2013 | Burger et al. |
| 8,464,029 B2 | 6/2013 | Day et al. |
| 8,817,793 B2 | 8/2014 | Mushano |
| 9,021,241 B2 | 4/2015 | Burger et al. |
| 9,043,769 B2 | 5/2015 | Vorbach |
| 9,053,292 B2 | 6/2015 | Abdallah |
| 9,104,399 B2 | 8/2015 | Busaba et al. |
| 9,128,725 B2 | 9/2015 | Meier et al. |
| 9,135,015 B1 | 9/2015 | Mizrahi et al. |
| 9,274,793 B2 | 3/2016 | Abdallah |
| 9,690,620 B2 | 6/2017 | Mitra et al. |
| 2001/0004756 A1 | 6/2001 | Inoue |
| 2002/0138714 A1 | 9/2002 | Leibholz et al. |
| 2003/0172248 A1 | 9/2003 | Streltsov |
| 2004/0123077 A1 | 6/2004 | Shebanow et al. |
| 2004/0128483 A1 | 7/2004 | Grochowski et al. |
| 2005/0005084 A1 | 1/2005 | Burger et al. |
| 2006/0112261 A1 | 5/2006 | Yourst et al. |
| 2008/0016324 A1 | 1/2008 | Burky et al. |
| 2008/0244184 A1* | 10/2008 | Lewis ................ G06Q 30/02 711/130 |
| 2008/0244230 A1 | 10/2008 | Burger et al. |
| 2008/0320274 A1 | 12/2008 | Singh et al. |
| 2009/0013135 A1 | 1/2009 | Burger et al. |
| 2009/0013160 A1 | 1/2009 | Burger et al. |
| 2009/0150653 A1 | 6/2009 | Monferrer et al. |
| 2010/0064121 A1* | 3/2010 | Alexander ........... G06F 9/3838 712/215 |
| 2010/0115237 A1 | 5/2010 | Brewer et al. |
| 2010/0146209 A1 | 6/2010 | Burger et al. |
| 2010/0325395 A1 | 12/2010 | Burger et al. |
| 2011/0060889 A1 | 3/2011 | Burger et al. |
| 2011/0072239 A1 | 3/2011 | Burger et al. |
| 2011/0078424 A1 | 3/2011 | Boehm et al. |
| 2012/0303933 A1 | 11/2012 | Manet et al. |
| 2012/0311306 A1 | 12/2012 | Mushano |
| 2013/0007415 A1 | 1/2013 | Babayan et al. |
| 2013/0054939 A1 | 2/2013 | Felch |
| 2013/0159674 A1 | 6/2013 | Muff et al. |
| 2013/0198499 A1 | 8/2013 | Dice et al. |
| 2014/0181475 A1 | 6/2014 | Abdallah |
| 2014/0181476 A1 | 6/2014 | Srinivasan et al. |
| 2014/0281402 A1 | 9/2014 | Comparan et al. |
| 2014/0281436 A1 | 9/2014 | Abdallah |
| 2014/0331236 A1 | 11/2014 | Mitra et al. |
| 2014/0372736 A1 | 12/2014 | Greenhalgh |
| 2015/0007188 A1 | 1/2015 | Sutanto et al. |
| 2015/0046686 A1* | 2/2015 | Abdallah ............ G06F 9/3863 712/220 |
| 2015/0067662 A1 | 3/2015 | Palalau |
| 2015/0088954 A1 | 3/2015 | Bakos |
| 2015/0100757 A1 | 4/2015 | Burger et al. |
| 2015/0127928 A1 | 5/2015 | Burger et al. |
| 2015/0199199 A1 | 7/2015 | Burger et al. |
| 2015/0199272 A1 | 7/2015 | Goel et al. |
| 2015/0277916 A1 | 10/2015 | Khartikov et al. |
| 2015/0301831 A1 | 10/2015 | Iyer et al. |
| 2016/0026469 A1 | 1/2016 | Lin |
| 2016/0179532 A1 | 6/2016 | Wright |
| 2016/0306772 A1 | 10/2016 | Burger et al. |
| 2017/0083313 A1* | 3/2017 | Sankaralingam ... G06F 15/7867 |
| 2017/0315812 A1 | 11/2017 | Smith et al. |
| 2017/0315814 A1 | 11/2017 | Smith et al. |
| 2017/0315815 A1 | 11/2017 | Smith et al. |
| 2018/0032344 A1 | 2/2018 | Smith et al. |

FOREIGN PATENT DOCUMENTS

| | | |
|---|---|---|
| WO | WO2000/049496 | 8/2000 |
| WO | WO2001/097054 | 12/2001 |

(56) References Cited

FOREIGN PATENT DOCUMENTS

| WO | WO2003/038645 | 5/2003 |
|---|---|---|
| WO | WO2008/061154 | 5/2008 |
| WO | WO2013/081556 | 6/2013 |
| WO | WO2014/193878 | 12/2014 |
| WO | WO2015/069583 | 5/2015 |

OTHER PUBLICATIONS

Duric et al., "Imposing Coarse-Grained Reconfiguration to General Purpose Processors," 2015 International Conference on Embedded Computer Systems: Architectures Modeling, and Simulation (SAMOS XV), Jul. 19, 2015, pp. 42-51.
International Search Report and Written Opinion for PCT/US2017/029226, dated Jul. 18, 2017, pp. 1-17.
Pricopi et al., "Bahurupi: A Polymorphic Heterogeneous Multi-Core Architecture," ACM Transactions on Architecture and Code Optimization, vol. 8, No. 4, Jan. 2012, pp. 1-21.
Robatmili et al., "Strategies for mapping dataflow blocks to distributed hardware," 41st IEEE International Symposium on Microarchitecture, Nov. 2008, pp. 23-34.
"Final Office Action Issued in U.S. Appl. No. 10/829,668", dated Oct. 30, 2007, 9 Pages.
"Final Office Action Issued in U.S. Appl. No. 10/829,668" dated Aug. 26, 2008, 18 Pages.
"Final Office Action Issued in U.S. Appl. No. 10/829,668", dated Oct. 13, 2009, 25 Pages.
"Final Office Action Issued in U.S. Appl. No. 10/829,668", dated Jul. 23, 2010, 27 Pages.
"Non-Final Office Action Issued in U.S. Appl. No. 10/829,668", dated May 24, 2007, 16 Pages.
"Non-Final Office Action Issued in U.S. Appl. No. 10/829,668", dated Mar. 9, 2010, 29 Pages.
"Non-Final Office Action Issued in U.S. Appl. No. 10/829,668", dated Mar. 24, 2009, 21 Pages.
"Final Office Action Issued in U.S. Appl. No. 12/136,645", dated Apr. 6, 2010, 19 Pages.
"Non-Final Office Action Issued in U.S. Appl. No. 12/136,645", dated Mar. 16, 2011, 19 Pages.
"Non-Final Office Action Issued in U.S. Appl. No. 12/136,645", dated Sep. 17, 2009, 20 Pages.
"Non-Final Office Action Issued in U.S. Appl. No. 15/224,469", dated May 17, 2018, 29 Pages.
"Non-Final Office Action Issued in U.S. Appl. No. 15/224,471", dated May 11, 2018, 12 Pages.
"Non-Final Office Action Issued in U.S. Appl. No. 15/224,592", dated Apr. 5, 2018, 9 Pages.
"Non-Final Office Action Issued in U.S. Appl. No. 15/224,624", dated May 2, 2018, 13 Pages.
Firdous, et al., "Comparative Analysis of LUT Design in FPGA"; In International Conference on Information Communication and Embedded Systems, Feb. 2014, 3 Pages.
Maher, et al., "The Good Block: Hardware/Software Design for Composable Block-Atomic Processors", In 15th Workshop on Interaction between Compilers and Computer Architectures, Feb. 12, 2011, pp. 9-16.
"International Search Report and Written Opinion Issued in PCT Application No. PCT/US2017/029224", dated Jul. 24, 2017, 18 Pages.
"International Preliminary Report on Patentability Issued in PCT Application No. PCT/US2002/034965", dated Feb. 11, 2004, 5 Pages.
"International Search Report Issued in PCT Application No. PCT/US2002/034965", dated Dec. 29, 2003, 4 Pages.
"International Search Report and Written Opinion Issued in PCT Application No. PCT/US2017/029225", dated Sep. 19, 2017, 16 Pages.

"International Search Report and Written Opinion Issued in PCT Application No. PCT/US2017/029227", dated Jul. 24, 2017, 17 Pages.
"International Search Report and Written Opinion Issued in PCT Application No. PCT/US2017/042970", dated Oct. 10, 2017, 16 Pages.
Altera Corporation, "Nios Embedded Processor Software Development Reference Manual", Document marked: Mar. 2001; Available at: https://extras.springer.com/2004/978-3-662-06730-7/literature/manual/mn1_niossft.pdf, 72 pages.
Bouwens et al., "Architecture Enhancements for the ADRES Coarse-Grained Reconfigurable Array," High Performance Embedded Architectures and Compilers, Springer Berlin Heidelberg pp. 66-81 (2008).
Burger et al., "Design and Implementation of the TRIPS EDGE Architecture", In Proceedings of the 32nd Annual International Symposium on Computer Architecture, Jun. 4, 2005, pp. 1-41.
Burger et al., "Scaling to the End of Silicon with EDGE Architectures," In Proceedings of Computer, vol. 37, Issue 7, Jul. 1, 2004, pp. 44-55.
Chang et al., "Hardware/Software Interface Design," UNU/IIST International Institute for Software Technology, Oct. 2001, 21 pages.
Cheah, et al., "iDEA: A DSP Block Based FPGA Soft Processor", In Proceedings of International Conference on Field-Programmable Technology, Dec. 10, 2012, pp. 151-158.
Chung, et al., "PROTOFLEX: Towards Scalable, Full-System Multiprocessor Simulations Using FPGAs", In Journal of ACM Transactions on Reconfigurable Technology and Systems, vol. 2, Issue 2, Jun. 2009, 32 pages.
Coons et al., "A Spatial Path Scheduling Algorithm for EDGE Architectures," In Proceedings of the 12th International Conference on Architectural Support for Programming Languages and Operating Systems (ASPLOS), Oct. 12, 2006, 12 pages.
Desikan et al., "Scalable Selective Re-Execution for EDGE Architectures," In Proceedings of the 11th International Conference on Architectural Support for Programming Languages and Operating Systems, Oct. 9, 2004, 13 pages.
Duric et al., "Dynamic-Vector Execution on a General Purpose EDGE Chip Multiprocessor," In Proceedings of the 2014 International Conference on Embedded Computers Systems: Architectures, Modeling, and Simulation (SAMOS XIV), Jul. 14-17, 2014, 8 pages.
Duric et al., "EVX: Vector Execution on Low Power EDGE Cores," Design, Automation and Test in European Conference and Exhibition, Mar. 24-28, 2014, 4 pages.
Duric et al., "ReCompAc: Reconfigurable compute accelerator," IEEE 2013 International Conference on Reconfigurable Computing and FPGAS (Reconfig), Dec. 9, 2013, 4 pages.
Dwiel, et al., "FPGA Modeling of Diverse Superscalar Processors", In Proceedings of the IEEE International Symposium on Performance Analysis of Systems & Software, Apr. 1, 2012, 12 pages.
Ernst, et al., "Cyclone: A Broadcast-Free Dynamic Instruction Scheduler with Selective Replay", In Proceedings of 30th Annual International Symposium on Computer Architecture, Jun. 9, 2013, 10 pages.
"Explicit Data Graph Execution", Retrieved on: Aug. 6, 2015, Available at: https://en.wikipedia.org/wiki/Explicit_Data_Graph_Execution.
Fallin, et al., "The Heterogeneous Block Architecture", In Proceedings of the IEEE 32nd International Conference on Computer Design, Oct. 19, 2014, pp. 386-393.
Fisher, "Trace Scheduling: A Technique for Global Microcode Compaction," IEEE Transactions on Computer, vol. C-30, No. 7, Jul. 1981, 13 pages.
Gebhart et al., "An Evaluation of the TRIPS Computer System," In Proceedings of the 14th international conference on Architectural support for programming languages and operating systems, Mar. 7, 2009, 12 pages.
Govindan, "E3:Energy-Efficient EDGE Architectures", In Dissertation, Aug. 2010, 244 pages.

(56) References Cited

OTHER PUBLICATIONS

Govindan et al., "Scaling Power and Performance via Processor Composability," IEEE Transaction on Computers, No. 1, Aug. 2014, 14 pages.
Govindaraju et al., "DySER: Unifying Functionality and Parallelism Specialization for Energy-Efficient Computing," IEEE Micro, IEEE Service Center, Sep. 1, 2012, 14 pages.
Gray, Jan, "Building a RISC System in an FPGA", In Circuit Cellar Magazine, Mar. 2000, pp. 1-25.
Gray, Jan, "Homebrewing RISCs in FPGAs", Retrieved on: May 16, 2016; Available at: http://www.fpgacpu.org/papers/j32.pdf.
Gray, Jan., "The Past and Future of FPGA Soft Processors", In Proceedings of International Conference on ReConFigurable Computing and FPGAs, Dec. 9, 2014, pp. 1-63.
Gray, "GRVI Phalanx: A Massively Parallel RISC-V FPGA Accelerator Accelerator," 24th IEEE Symposium on Field-Programmable Custom Computing Machines (FCCM 2016), May 1, 2016, 4 pages.
Gray and Smith, "Towards an Area-Efficient Implementation of a High ILP EDGE Soft Processor: Comparing Out-of-Order Dataflow Instruction Scheduler Designs," poster temporarily on display during The 22nd IEEE International Symposium on Field-Programmable Custom Computing Machines May 11-13, 2014, Boston, Massachusetts (poster on display for approximately 1-2 hours, and less than one day, May 2014).
Gupta, "Design Decisions for Tiled Architecture Memory Systems," document marked Sep. 18, 2009, available at: http://cseweb.ucsd.edu/~a2gupta/uploads/2/2/7/3/22734540/researchexam.paper.pdf, 14 pages.
Hao et al., "Increasing the Instruction Fetch Rate via Block-Structured Instruction Set Architectures", In Proceedings of the 29th Annual IEEE/ACM International Symposium on Microarchitecture, Dec. 2, 1996, pp. 191-200.
Huang et al., "Compiler-Assisted Sub-Block Reuse," Retrieved on: Apr. 9, 2015; Available at: http://citeseerx.ist.psu.edu/viewdoc/download?doi=10.1.1.33.155&rep=rep1&type=pdf (also published as Huang & Lilja, "Compiler-Assisted Sub-Block Reuse," UMSI ResearchReport/University of Minnesota Supercomputer Institute 73 (2000)).
Huang, "Improving Processor Performance Through Compiler-Assisted Block Reuse," In Doctoral Dissertation, May 2000, 125 pages.
Ipek et al., "Core Fusion: Accommodating Software Diversity in Chip Multiprocessors", In Proceedings of the 34th annual international symposium on Computer architecture, Jun. 9, 2007, 12 pages.
Jain et al., "DeCO: A DSP Block Based FPGA Accelerator Overlay with Low Overhead Interconnect," 24th IEEE Symposium on Field-Programmable Custom Computing Machines (FCCM 2016), May 1, 2016, 8 pages.
Jones, et al., "An FPGA-based VLIW Processor with Custom Hardware Execution", In Proceedings of the ACM/SIGDA 13th international symposium on Field-programmable gate arrays, Feb. 20, 2005, pp. 107-117.
Jourdan, et al., "Exploring Configurations of Functional Units in an Out-of-Order Superscalar Processor", In Proceedings of the 22nd annual international symposium on Computer architecture, Jul. 1995, pp. 117-125.
Kavi, et al., "Concurrency, Synchronization, Speculation—the Dataflow Way", In Journal of Advances in Computers, vol. 96, Nov. 23, 2013, pp. 1-41.
Keckler et al., "Tera-Op Reliable Intelligently Adaptive Processing System (Trips)," In AFRL-IF-WP-TR-2004-1514, document dated Apr. 2004, 29 Pages.
Kiefer, et al., "ParaNut—An Open, Scalable, and Highly Parallel Processor Architecture for FPGA-based Systems", In Proceedings of Embedded World Conference, Feb. 2015, 7 pages.
Kim, et al., "Composable Lightweight Processors", In Proceedings of the 40th Annual IEEE/ACM International Symposium on Microarchitecture, Dec. 1, 2007, pp. 381-394.

Kozumplik, et al., "TRIPS to the Semantic EDGE", Retrieved on: Sep. 22, 2015, Available at: http://vbn.aau.dk/ws/files/61072300/1212050422.pdf.
Laforest, Charles Eric., "High-Speed Soft-Processor Architecture for FPGA Overlays", In Doctoral dissertation, University of Toronto, Jun. 2015, 253 pages.
Li et al., "Code Layout Optimization for Defensiveness and Politeness in Shared Cache," 11 pages, (also published as Li, et al, "Code Layout Optimization for Defensiveness and Politeness in Shared Cache" 43rd International Conference on Parallel Processing (ICPP), IEEE, pp. 151-161 (2014)).
Liu, "Hardware Techniques to Improve Cache Efficiency", In Dissertation of the University of Texas at Austin, May 2009, 189 pages.
Maher, "Atomic Block Formation for Explicit Data Graph Execution Architectures", In Dissertation of Doctor of Philosophy, Aug. 2010, 185 pages.
Maher et al., "Merging Head and Tail Duplication for Convergent Hyperblock Formation," In Annual IEEE/ACM International Symposium on Microarchitecture, Dec. 2006, 12 pages.
McDonald et al., "Characterization of TCC on Chip-Multiprocessors," Parallel Architectures and Compilation Techniques, 2005. PACT 2005. 14th International Conference on. IEEE, 2005, 12 pages.
McDonald, et al., "TRIPS Processor Reference Manual", In Technical Report TR-05-19, Mar. 10, 2005, 194 pages.
Mei et al., "ADRES: An Architecture with Tightly Coupled VLIW Processor and Coarse-Grained Reconfiguration Matrix," 10 pages, (also published as Mei, et al. "ADRES: An architecture with tightly coupled VLIW processor and coarse-grained reconfigurable matrix," In Proceedings of 13th International Conference on Field-Programmable Logic and Applications, pp. 61-70 (Sep. 2003)).
Melvin et al., "Enhancing Instruction Scheduling with a Block-Structured ISA," International Journal of Parallel Programming, vol. 23, No. 3, Jun. 1995, 23 pages.
Microsoft Research, "E2," document downloaded on Apr. 10, 2015 from http://research.microsoft.com/en-us/projects/e2/.
Munshi, et al., "A Parameterizable SIMD Stream Processor", In Proceedings of Canadian Conference on Electrical and Computer Engineering, May 1, 2005, pp. 806-811.
Nagarajan et al., "Critical Path Analysis of the TRIPS Architecture," In IEEE International Symposium on Performance Analysis of Systems and Software, Mar. 19, 2006, 11 pages.
Nagarajan et al., "A Design Space Evaluation of Grid Processor Architectures," In Proceedings of the 34th annual ACM/IEEE international symposium on Microarchitecture, Dec. 1, 2001, pp. 40-51.
Nagarajan et al., "Static Placement, Dynamic Issue (SPDI) Scheduling for EDGE Architectures," In Proceedings of the 13th International Conference on Parallel Architecture and Compilation Techniques, Sep. 29, 2004, 11 pages.
Ovtcharov, et al., "TILT: A Multithreaded VLIW Soft Processor Family", In Proceedings of 23rd International Conference on Field programmable Logic and Applications, Sep. 2, 2013, 4 pages.
Park et al., "Polymorphic Pipeline Array: A flexible multicore accelerator with virtualized execution for mobile multimedia applications," 42nd Annual IEEE/ACM International Symposium on Microarchitecture, Dec. 12, 2009, 11 pages.
Patterson et al., "Computer Architecture: A Quantitative Approach," Morgan Kaufmann Publishers, Inc., 1990, pp. 146-161.
Pengfei et al., "M5 Based EDGE Architecture Modeling", In Proceedings of IEEE International Conference on Computer Design, Oct. 3, 2010, pp. 289-296.
Pierce et al., "Wrong-Path Instruction Prefetching", In Proceedings of the 29th Annual IEEE/ACM International Symposium on Microarchitecture, Dec. 2, 1996, pp. 1-17.
Putnam, et al., "Dynamic Vectorization in the E2 Dynamic Multicore Architecture", In Proceedings of ACM SIGARCH Computer Architecture News, vol. 38, No. 4, Sep. 2010, pp. 27-32.
Requa et al., "The Piecewise Data Flow Architecture: Architectural Concepts," IEEE Transactions on Computers, vol. C-32, No. 5, May 1983, 14 pages.

(56) References Cited

OTHER PUBLICATIONS

Robatmili et al., "Exploiting Criticality to Reduce Bottlenecks in Distributed Uniprocessors," 17th IEEE International Symposium on High-Performance Computer Architecture (HPCA-17), Feb. 2011, 12 pages.
Robatmili, et al., "How to implement effective prediction and forwarding for fusable dynamic multicore architectures", In Proceedings of 19th IEEE International Symposium on High Performance Computer Architecture, Feb. 2013, 12 pages.
Roesner, "Counting Dependence Predictors," In Undergraduate Honors Thesis, May 2, 2008, 25 pages.
Rosière, et al., "An Out-of-Order Superscalar Processor on FPGA: The ReOrder Buffer Design", In Proceedings of the Conference on Design, Automation and Test in Europe, Mar. 12, 2012, 6 pages.
Rusten, et al., "Implementing a Heterogeneous Multi-Core Prototype in an FPGA", In Master's Thesis of Norwegian University of Science and Technology, Jul. 2012, 128 pages.
Samala, et al., "Methodology to Derive Resource Aware Context Adaptable Architectures for FPGAs", In Proceedings of IET Computers & Digital Techniques, vol. 4, Issue 1, Jan. 2010, pp. 1-15.
Sankaralingam et al., "Distributed Microarchitectural Protocols in the TRIPS Prototype Processor," 12 pages (also published as "Distributed Microarchitectural Protocols in the TRIPS Prototype Processor," Proceedings of 39th Annual IEEE/ACM International Symposium on Microarchitecture, pp. 480-491 (2006)).
Sankaralingam, et al., "Exploiting ILP, TLP, and DLP with the Polymorphous TRIPS Architecture", In Proceedings of the 30th annual international symposium on Computer architecture, Jun. 9, 2013, 12 pages.
Sankaralingam, "Polymorphous Architectures: A Unified Approach for Extracting Concurrency of Different Granularities", In Doctoral Dissertation of Philosophy, Aug. 2007, 276 pages.
Sankaralingam, et al., "TRIPS: A Polymorphous Architecture for Exploiting ILP, TLP, and DLP", In Journal of ACM Transactions on Architecture and Code Optimization, vol. 1, No. 1, Mar. 2004, pp. 62-93.
Sethumadhavan et al., "Design and Implementation of the TRIPS Primary Memory System," In Proceedings of International Conference on Computer Design, Oct. 1, 2006, 7 pages.
Sethumadhavan, et al., "Late-Binding: Enabling Unordered Load-Store Queues", In Proceedings of the 34th annual international symposium on Computer architecture, Jun. 9, 2007, 11 pages.
Sibi et al., "Scaling Power and Performance via Processor Composability," University of Texas at Austin technical report No. TR-10-14 (2010), 20 pages.
Smith, et al., "Compiling for EDGE Architectures", In Proceedings of International Symposium on Code Generation and Optimization, Mar. 26, 2006, 11 pages.
Smith et al., "Dataflow Predication", In Proceedings of 39th Annual IEEE/ACM International Symposium on Microarchitecture, Dec. 9, 2006, 12 pages.
Smith, "Explicit Data Graph Compilation," In Thesis, Dec. 2009, 201 pages.
Smith, "TRIPS Application Binary Interface (ABI) Manual," Technical Report TR-05-22, Department of Computer Sciences, The University of Texas at Austin, Technical Report TR-05-22, document marked Oct. 10, 2006, 16 pages.
Sohi et al., "Multiscalar Processors," In Proceedings of 22nd Annual International Symposium on Computer Architecture, Jun. 22-24, 1995, 12 pages.
Sohi, "Retrospective: multiscalar processors," In Proceedings of the 25th Annual International Symposium on Computer Architectures, Jun. 27-Jul. 1, 1998, pp. 111-1114.
Souza et al., "Dynamically Scheduling VLIW Instructions", In Journal of Parallel and Distributed Computing, vol. 60, Jul. 2000, pp. 1480-1511.
Subramaniam, et al., "Fire-and-Forget: Load/Store Scheduling with No Store Queue at All", In Proceedings of 39th Annual IEEE/ACM International Symposium on Microarchitecture, Dec. 2006, 12 pages.

Tamches et al., "Dynamic Kernel Code Optimization," In Workshop on Binary Translation, 2001, 10 pages.
Tan, et al., "Mapping-Aware Constrained Scheduling for LUT-Based FPGAs", In Proceedings of the ACM/SIGDA International Symposium on Field-Programmable Gate Arrays, Feb. 22, 2015, pp. 190-199.
Vander Zanden et al., "MILO: A Microarchitecture and Logic Optimizer," Proceedings of 25th ACM/IEEE Design Automation Conference, Jun. 12-15, 1988, pp. 403-408.
Vander Zanden, "Synthesis of Memories From Behavioral HDLs," Proceedings of 7th Annual IEEE International ASIC Conference and Exhibit, Sep. 19-23, 1994, pp. 71-74.
Vucha, et al., "A Novel Methodology for task Distribution in Heterogeneous Reconfigurable Computing System", In International Journal of Embedded systems and Applications, vol. 5, Issue 1, Mar. 2015, pp. 19-39.
Wawrzynek, et al., "Rethinking FPGA Computing with a Many-Core Approach", In Proceedings of Workshop on Computer Architecture and Reconfigurable Logic, Dec. 5, 2010, pp. 1-6.
Wohl et al., "Using Verilog Simulation Libraries for ATPG," Proceedings of 1999 International Test Conference, Sep. 28-30, 1999, pp. 1011-1020.
Wong, et al., "Efficient Methods for Out-of-Order Load/Store Execution for High-Performance Soft Processors", In Proceedings of International Conference on Field-Programmable Technology, Dec. 9, 2013, pp. 442-445.
Wong et al., ""High Performance Instruction Scheduling Circuits for Out-of-Order Soft Processors,"" 24th IEEE Symposium on Field-Programmable Custom Computing Machines (FCCM 2016), May 1, 2016, 8 pages.
Wu et al., "Block Based Fetch Engine for Superscalar Processors", In Proceedings of the 15th International Conference on Computer Applications in Industry and Engineering, Nov. 7, 2002, 4 pages.
Xilinx, Inc., "MicroBlaze Processor Reference Guide", Retrieved on: May 16, 2016; Available at: http://www.xilinx.com/support/documentation/sw_manuals/xilinx14_4/mb_ref_guide.pdf, 256 pages.
Yiannacouras, et al., "VESPA: Portable, Scalable, and Flexible FPGA-based Vector Processors", In Proceedings of the international conference on Compilers, architectures and synthesis for embedded systems, Oct. 19, 2008, pp. 61-70.
Yu, et al., "Vector Processing As a Soft-core CPU Accelerator", In Proceedings of the 16th international ACM/SIGDA symposium on Field programmable gate arrays, Feb. 24, 2008, pp. 222-232.
Zmily, "Block-Aware Instruction Set Architecture", In Doctoral Dissertation, Jun. 2007, 176 pages.
Zmily et al., "Block-Aware Instruction Set Architecture", In Proceedings of ACM Transactions on Architecture and Code Optimization, vol. 3, Issue 3, Sep. 2006, pp. 327-357.
Zmily, et al., "Improving Instruction Delivery with a Block-Aware ISA", In Proceedings of 11th International Euro-Par Conference on Parallel Processing, Aug. 30, 2005, pp. 530-539.
"Final Office Action Issued in U.S. Appl. No. 15/224,469", dated Feb. 7, 2019, 36 Pages.
"Final Office Action Issued in U.S. Appl. No. 15/224,471", dated Mar. 5, 2019, 17 Pages.
"Final Office Action Issued in U.S. Appl. No. 15/224,592", dated Jan. 17, 2019, 11 Pages.
"Final Office Action Issued in U.S. Appl. No. 15/224,624", dated Mar. 5, 2019, 17 Pages.
"Non-Final Office Action Issued in U.S. Appl. No. 15/224,592", dated Sep. 13, 2019, 12 Pages.
"Non-Final Office Action Issued in U.S. Appl. No. 15/224,471", dated Sep. 17, 2019, 17 Pages.
"Non-Final Office Action Issued in U.S. Appl. No. 15/224,624", dated Oct. 30, 2019, 16 Pages.
"Office Action Issued in European Patent Application No. 17721016.8", dated Jul. 2, 2020, 8 Pages.
"Office Action Issued in European Patent Application No. 17721017.6", dated Jul. 7, 2020, 9 Pages.
"Office Action Issued in European Patent Application No. 17733162.6" dated Jul. 14, 2020, 5 Pages.
"Non Final Office Action Issued in U.S. Appl. No. 15/224,469", dated Jul. 2, 2020, 26 Pages.

(56) References Cited

OTHER PUBLICATIONS

"Final Office Action Issued in U.S. Appl. No. 15/224,624", dated Jul. 28, 2020, 12 Pages.
"Final Office Action Issued in U.S. Appl. No. 15/224,469", dated Mar. 4, 2021, 17 Pages.
"Office Action Issued in European Patent Application No. 17721016.8", dated Mar. 30, 2021, 8 Pages.

* cited by examiner

INCREMENTAL SCHEDULER FOR OUT-OF-ORDER BLOCK ISA PROCESSORS

CROSS-REFERENCE TO RELATED APPLICATIONS

This application claims the benefit of U.S. Provisional Patent Application No. 62/328,976, entitled "OUT-OF-ORDER BLOCK-BASED PROCESSORS AND INSTRUCTION SCHEDULERS," filed Apr. 28, 2016, which is incorporated herein by reference in its entirety.

BACKGROUND

Microprocessors have benefitted from continuing gains in transistor count, integrated circuit cost, manufacturing capital, clock frequency, and energy efficiency due to continued transistor scaling predicted by Moore's law, with little change in associated processor Instruction Set Architectures (ISAs). However, the benefits realized from photolithographic scaling, which drove the semiconductor industry over the last 40 years, are slowing or even reversing. Reduced Instruction Set Computing (RISC) architectures have been the dominant paradigm in processor design for many years. Out-of-order superscalar implementations have not exhibited sustained improvement in area or performance. Accordingly, there is ample opportunity for improvements in processor ISAs to extend performance improvements.

SUMMARY

Methods, apparatus, and computer-readable storage devices are disclosed for configuring, operating, and compiling code for, block-based processor architectures (BB-ISAs), including explicit data graph execution (EDGE) architectures. The described techniques and tools for solutions for, e.g., improving processor performance and/or reducing energy consumption can be implemented separately, or in various combinations with each other. As will be described more fully below, the described techniques and tools can be implemented in a digital signal processor, microprocessor, application-specific integrated circuit (ASIC), a soft processor (e.g., a microprocessor core implemented in a field programmable gate array (FPGA) using reconfigurable logic), programmable logic, or other suitable logic circuitry. As will be readily apparent to one of ordinary skill in the art, the disclosed technology can be implemented in various computing platforms, including, but not limited to, servers, mainframes, cellphones, smartphones, handheld devices, handheld computers, personal digital assistants (PDAs), touch screen tablet devices, tablet computers, wearable computers, and laptop computers.

Soft processor implementations of block-based processor architectures can improve design productivity. For example, descriptions of a block-based soft-processor written in a suitable description language (e.g., C, SystemC, SystemVerilog, or Verilog) can undergo logic synthesized to generate a gate-level netlist mapped to an FPGA. A bitstream is generated for the FPGA that is used to program the FPGA. A costly initial port of software into hardware instead becomes a simple cross-compile targeting the soft processors, and most design turns are quick recompiles. Application bottlenecks can then be offloaded to custom hardware exposed as new instructions, function units, autonomous accelerators, memories, or interconnects.

Certain examples of the disclosed technology allow for the configuration of high instruction level parallelism (ILP), out-of-order (OoO) superscalar soft processors without reduced complexity and overhead. In some examples, an Explicit Data Graph Execution (EDGE) instruction set architecture is provided for area and energy efficient high ILP execution. Together the EDGE architecture and its compiler finesse away much of the register renaming, CAMs, and complexity, enabling an out-of-order processor for only a few hundred FPGA lookup tables ("LUTs") more than an in-order scalar RISC.

This disclosed technology introduces an EDGE ISA and explores how EDGE microarchitectures compare to in-order RISCs. Methods and apparatus are disclosed for building small, fast dataflow instruction schedulers in FPGAs.

DETAILED DESCRIPTION

I. General Considerations

Figure 1:
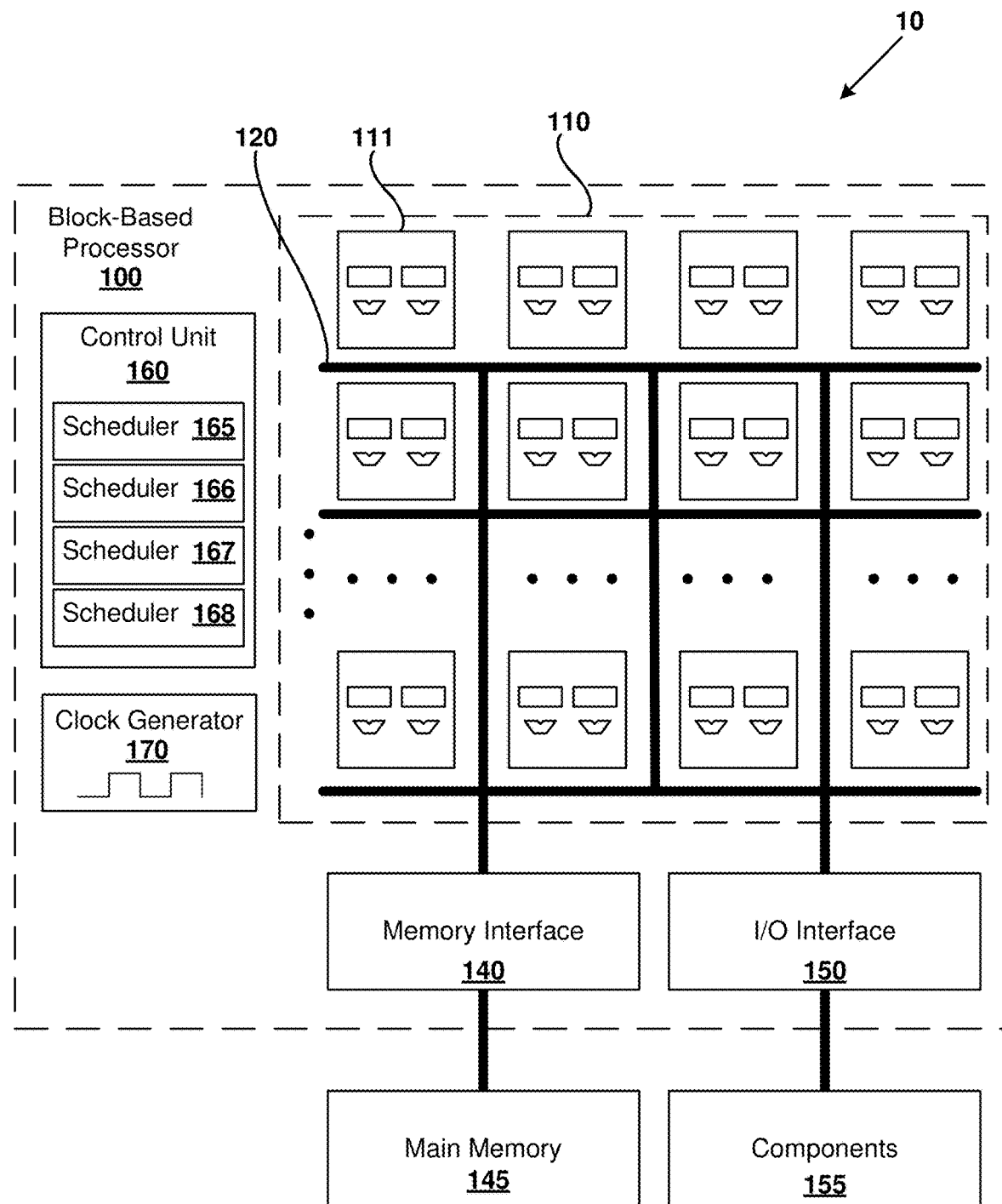
FIG. 1 illustrates an example block-based processor including multiple processor cores as can be employed according to some examples of the disclosed technology.

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "emit," "verify," "execute," and "initiate" to describe the disclosed methods. These terms are high-level descriptions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., computer-readable storage media). The computer-executable instructions can be part of, for example, a dedicated software application or a software application that is accessed or downloaded via a web browser or other software application (such as a remote computing application). Such software can be executed, for example, on a single local computer (e.g., with general-purpose and/or block-based processors executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

II. Introduction to the Disclosed Technologies

Superscalar out-of-order microarchitectures employ substantial circuit resources to rename registers, schedule instructions in dataflow order, clean up after miss-speculation, and retire results in-order for precise exceptions. This includes expensive circuits, such as deep, many-ported register files, many-ported content-accessible memories (CAMs) for dataflow instruction scheduling wakeup, and many-wide bus multiplexers and bypass networks, all of which are resource intensive. For example, FPGA-based implementations of multi-read, multi-write RAMs typically require a mix of replication, multi-cycle operation, clock doubling, bank interleaving, live-value tables, and other expensive techniques.

The disclosed technologies can realize performance enhancement through application of techniques including high instruction-level parallelism (ILP), out-of-order (OoO), superscalar execution, while avoiding substantial complexity and overhead in both processor hardware and associated software. In some examples of the disclosed technology, a block-based processor uses an EDGE ISA designed for area- and energy-efficient, high-ILP execution. In some examples, use of EDGE architectures and associated compilers finesses away much of the register renaming, CAMs, and complexity.

In certain examples of the disclosed technology, an EDGE ISA can eliminate the need for one or more complex architectural features, including register renaming, dataflow analysis, misspeculation recovery, and in-order retirement while supporting mainstream programming languages such as C and C++. In certain examples of the disclosed technology, a block-based processor executes a plurality of two or more instructions as an atomic block. Block-based instructions can be used to express semantics of program data flow and/or instruction flow in a more explicit fashion, allowing for improved compiler and processor performance. In certain examples of the disclosed technology, an explicit data graph execution instruction set architecture (EDGE ISA) includes information about program control flow that can be used to improve detection of improper control flow instructions, thereby increasing performance, saving memory resources, and/or and saving energy.

In some examples of the disclosed technology, instructions organized within instruction blocks are fetched, executed, and committed atomically. Instructions inside blocks execute in dataflow order, which reduces or eliminates using register renaming and provides power-efficient OoO execution. A compiler can be used to explicitly encode data dependencies through the ISA, reducing or eliminating burdening processor core control logic from rediscovering dependencies at runtime. Using predicated execution, intra-block branches can be converted to dataflow instructions, and dependencies, other than memory dependencies, can be limited to direct data dependencies. Disclosed target form encoding techniques allow instructions within a block to communicate their operands directly via operand buffers, reducing accesses to a power-hungry, multi-ported physical register files.

Between instruction blocks, instructions can communicate using memory and registers. Thus, by utilizing a hybrid dataflow execution model, EDGE architectures can still support imperative programming languages and sequential memory semantics, but desirably also enjoy the benefits of out-of-order execution with near in-order power efficiency and complexity.

Parallel schedulers in a block-based processor implementation may include hardware to store instruction dependencies for each instruction in an instruction block. Thus, hundreds of LUTs and FFs are used just to maintain 32×12b of ready state—a few LUTs worth of LUT RAM—and this area doubles as the instruction window size doubles. Also, each cycle, th parallel scheduler next readys LUTs recompute the readiness of every instruction, even though (broadcast cases notwithstanding) each issued instruction affects at most two others' ready state.

In certain examples disclosed herein, incremental schedulers store decoded and active ready state in LUT RAM, maintain the frontier of ready instructions (ready instruction IDs) in queues, and evaluate the ready status of 2-4 target instructions per cycle. Compared to an array of flip-flops, LUT RAM is fast and dense but can exhibit some shortcomings: many LUT RAMs include no way to flash clear it (clear all memory cells simultaneously) and may supports a limited number of writes (e.g., one write) per cycle.

In certain examples disclosed herein, incremental schedulers a hybrid of LUT RAM and a corresponding array of flip-flops. When mapped to an example Xilinx Series-7 FPGA, decoded and active ready state are stored in several banks of 16×4 true dual port LUT RAM, which is validated by a 16×1 flash clearable RAM comprising an array of discrete flip-flops. This structure includes 16 FFs (with common reset), 16 write port address decoders (eight 5,5-LUTs), and a 16:1 read port mux (four 6-LUTs, two MUXF7s, one MUXF8), thereby consuming just three slices in all. Each read from this hybrid reads the 4-bit LUT RAM entry and its valid bit is stored in a flip-flop. Each write updates the LUT RAM and sets its valid bit (in a flip-flop). Depending on the value of the valid bit, either the value stored in memory, or a reset value, are output.

III. Example Block-Based Processor

FIG. 1 is a block diagram 10 of a block-based processor 100 as can be implemented in some examples of the disclosed technology. The processor 100 is configured to execute atomic blocks of instructions according to an instruction set architecture (ISA), which describes a number of aspects of processor operation, including a register model, a number of defined operations performed by block-based instructions, a memory model, interrupts, and other architectural features. The block-based processor includes a plurality of one or more processing cores 110, including a processor core 111. The block-based processor can be implemented in as a custom or application-specific integrated circuit (e.g., including a system-on-chip (SoC) integrated circuit), as a field programmable gate array (FPGA) or other reconfigurable logic, or as a soft processor virtual machine hosted by a physical general purpose processor.

As shown in FIG. 1, the processor cores are connected to each other via core interconnect 120. The core interconnect 120 carries data and control signals between individual ones of the cores 110, a memory interface 140, and an input/output (I/O) interface 150. The core interconnect 120 can transmit and receive signals using electrical, optical, magnetic, or other suitable communication technology and can provide communication connections arranged according to a number of different topologies, depending on a particular desired configuration. For example, the core interconnect 120 can have a crossbar, a bus, a point-to-point bus, or other suitable topology. In some examples, any one of the cores 110 can be connected to any of the other cores, while in other examples, some cores are only connected to a subset of the other cores. For example, each core may only be connected to a nearest 4, 8, or 20 neighboring cores. The core interconnect 120 can be used to transmit input/output data to and from the cores, as well as transmit control signals and other information signals to and from the cores. For example, each of the cores 110 can receive and transmit semaphores that indicate the execution status of instructions currently being executed by each of the respective cores. In some examples, the core interconnect 120 is implemented as wires connecting the cores 110, and memory system, while in other examples, the core interconnect can include circuitry for multiplexing data signals on the interconnect wire(s), switch and/or routing components, including active signal drivers and repeaters, or other suitable circuitry. In some examples of the disclosed technology, signals transmitted within and to/from the processor 100 are not limited to full swing electrical digital signals, but the processor can be configured to include differential signals, pulsed signals, or other suitable signals for transmitting data and control signals.

In the example of FIG. 1, the memory interface 140 of the processor includes interface logic that is used to connect to memory 145, for example, memory located on another integrated circuit besides the processor 100 (e.g., the memory can be static RAM (SRAM) or dynamic RAM (DRAM)), or memory embedded on the same integrated circuit as the processor (e.g., embedded SRAM or DRAM (eDRAM)). The memory interface 140 and/or the main memory can include caches (e.g., n-way or associative caches) to improve memory access performance In some examples the cache is implemented using static RAM (SRAM) and the main memory 145 is implemented using dynamic RAM (DRAM). In some examples the memory interface 140 is included on the same integrated circuit as the other components of the processor 100. In some examples, the memory interface 140 includes a direct memory access (DMA) controller allowing transfer of blocks of data in memory without using register file(s) and/or the processor 100. In some examples, the memory interface 140 manages allocation of virtual memory, expanding the available main memory 145. In some examples, support for bypassing cache structures or for ensuring cache coherency when performing memory synchronization operations (e.g., handling contention issues or shared memory between plural different threads, processes, or processors) are provided by the memory interface 140 and/or respective cache structures.

The I/O interface 150 includes circuitry for receiving and sending input and output signals to other components 155, such as hardware interrupts, system control signals, peripheral interfaces, co-processor control and/or data signals (e.g., signals for a graphics processing unit, floating point coprocessor, physics processing unit, digital signal processor, or other co-processing components), clock signals, semaphores, or other suitable I/O signals. The I/O signals may be synchronous or asynchronous. In some examples, all or a portion of the I/O interface is implemented using memory-mapped I/O techniques in conjunction with the memory interface 140. In some examples the I/O signal implementation is not limited to full swing electrical digital signals, but the I/O interface 150 can be configured to provide differential signals, pulsed signals, or other suitable signals for transmitting data and control signals.

The block-based processor 100 can also include a control unit 160. The control unit 160 supervises operation of the processor 100. Operations that can be performed by the control unit 160 can include allocation and de-allocation of cores for performing instruction processing, control of input data and output data between any of the cores, register files, the memory interface 140, and/or the I/O interface 150, modification of execution flow, and verifying target location(s) of branch instructions, instruction headers, and other changes in control flow. The control unit 160 can generate and control the processor according to control flow and metadata information representing exit points and control flow probabilities for instruction blocks.

The control unit 160 can also process hardware interrupts, and control reading and writing of special system registers, for example a program counter stored in one or more register file(s). In some examples of the disclosed technology, the control unit 160 is at least partially implemented using one or more of the processing cores 110, while in other examples, the control unit 160 is implemented using a non-block-based processing core (e.g., a general-purpose RISC processing core coupled to memory, a hard macro processor block provided in an FPGA, or a general purpose soft processor). In some examples, the control unit 160 is implemented at least in part using one or more of: hardwired finite state machines, programmable microcode, programmable gate arrays, or other suitable control circuits. In alternative examples, control unit functionality can be performed by one or more of the cores 110.

The control unit 160 includes a number of schedulers 165-168 that are used to control instruction pipelines of the processor cores 110. In other examples, schedulers can be arranged so that they are contained with each individual processor core. As used herein, scheduler block allocation refers to directing operation of an instruction blocks, including initiating instruction block mapping, fetching, decoding, execution, committing, aborting, idling, and refreshing an instruction block. Further, instruction scheduling refers to scheduling the issuance and execution of instructions within an instruction block. For example, based on instruction dependencies and data indicating a relative ordering for memory access instructions, the control unit 160 can determine which instruction(s) in an instruction block are ready to issue and initiate issuance and execution of the instructions. Processor cores 110 are assigned to instruction blocks during instruction block mapping. The recited stages of instruction operation are for illustrative purposes and in some examples of the disclosed technology, certain operations can be combined, omitted, separated into multiple operations, or additional operations added. Each of the schedulers 165-168 schedules the flow of instructions, including allocation and de-allocation of cores for performing instruction processing, control of input data and output data between any of the cores, register files, the memory interface 140, and/or the I/O interface 150. Each of the scheduler 165-168 can include incremental scheduling capability, including the use of queues for storing scheduler state data, such as decoded and active ready state data.

The block-based processor 100 also includes a clock generator 170, which distributes one or more clock signals to various components within the processor (e.g., the cores 110, interconnect 120, memory interface 140, and I/O interface 150). In some examples of the disclosed technology, all of the components share a common clock, while in other examples different components use a different clock, for example, a clock signal having differing clock frequencies. In some examples, a portion of the clock is gated to allowing power savings when some of the processor components are not in use. In some examples, the clock signals are generated using a phase-locked loop (PLL) to generate a signal of fixed, constant frequency and duty cycle. Circuitry that receives the clock signals can be triggered on a single edge (e.g., a rising edge) while in other examples, at least some of the receiving circuitry is triggered by rising and falling clock edges. In some examples, the clock signal can be transmitted optically or wirelessly.

IV. Example Block-Based Processor Microarchitecture

Figure 2:
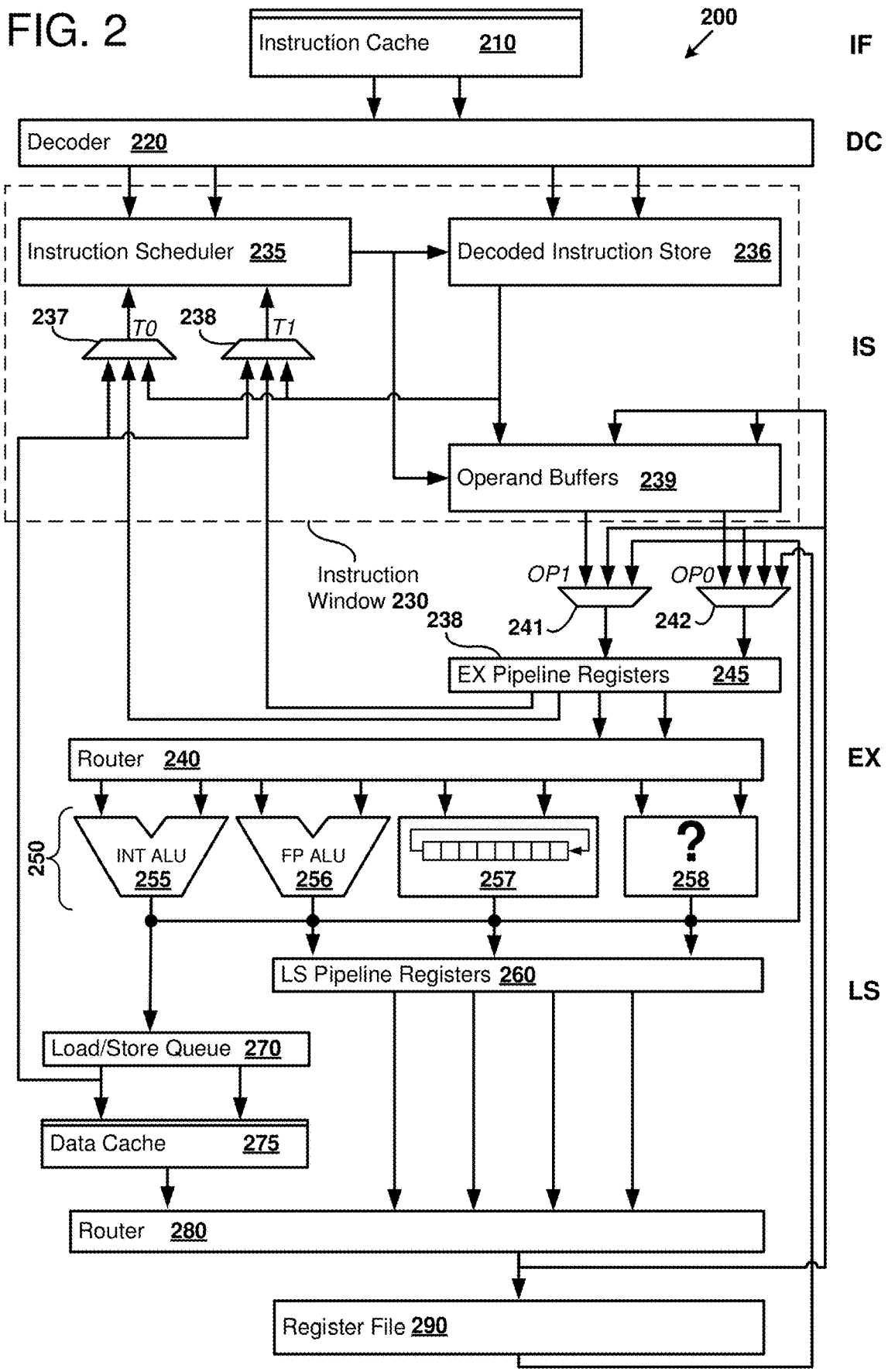
FIG. 2 illustrates an example microarchitecture for implementing a block-based processor as can be used in certain examples of the disclosed technology.

FIG. 2 is a block diagram further detailing an example microarchitecture 200 for implementing the block-based processor 100, and in particular, an instance of one of the block-based processor cores, as can be used in certain examples of the disclosed technology. For ease of explanation, the exemplary microarchitecture has five pipeline stages including: instruction fetch (IF), decode (DC), issue, including operand fetch (IS), execute (EX), and memory/data access (LS). However, it will be readily understood by one of ordinary skill in the relevant art that modifications to the illustrated microarchitecture, such as adding/removing stages, adding/removing units that perform operations, and other implementation details can be modified to suit a particular application for a block-based processor.

As shown in FIG. 2, the processor core includes an instruction cache 210 that is coupled to an instruction decoder 220. The instruction cache 210 is configured to receive block-based processor instructions from a memory. In some FPGA implementations, the instruction cache can be implemented by a dual read port, dual write port, 18 or 36 Kb (kilobit), 32 bit wide block RAM. In some examples, the physical block RAM is configured to operate as two or more smaller block RAMs.

The processor core further includes an instruction window 230, which includes an instruction scheduler 235, a decoded instruction store 236, and a plurality of operand buffers 239. In FPGA implementations, each of these instruction window components 230 can be implemented including the use of LUT RAM (e.g., with SRAM configured as lookup tables) or BRAM (block RAM). The instruction scheduler 235 can send an instruction identifier (instruction ID or IID) for an instruction to the decoded instruction store 236 and the operand buffers 239 as a control signal. As discussed further below, each instruction in an instruction block has an associated instruction identifier that uniquely identifies the instruction within the instruction block. In some examples, instruction targets for sending the result of executing an instruction are encoded in the instruction. In this way, dependencies between instructions can be tracked using the instruction identifier instead of monitoring register dependencies. In some examples, the processor core can include two or more instruction windows. In some examples, the processor core can include one instruction window with multiple block contexts.

As will be discussed further below, the microarchitecture 200 includes a register file 290 that stores data for registers defined in the block-based processor architecture, and can have one or more read ports and one or more write ports. Because an instruction block executes on a transactional basis, changes to register values made by an instance of an instruction block are not visible to the same instance; the register writes will be committed upon completing execution of the instruction block.

The decoded instruction store 236 stores decoded signals for controlling operation of hardware components in the processor pipeline. For example, a 32-bit instruction may be decoded into 128-bits of decoded instruction data. The decoded instruction data is generated by the decoder 220 after an instruction is fetched. The operand buffers 239 store operands (e.g., register values received from the register file, data received from memory, immediate operands coded within an instruction, operands calculated by an earlier-issued instruction, or other operand values) until their respective decoded instructions are ready to execute. Instruction operands and predicates for the execute phase of the pipeline are read from the operand buffers 239, respectively, not (directly, at least) from the register file 290. The instruction window 230 can include a buffer for predicates directed to an instruction, including wired-OR logic for combining predicates sent to an instruction by multiple instructions.

In some examples, all of the instruction operands, except for register read operations, are read from the operand buffers 239 instead of the register file. In some examples the values are maintained until the instruction issues and the operand is communicated to the execution pipeline. In some FPGA examples, the decoded instruction store 236 and operand buffers 239 are implemented with a plurality of LUT RAMs.

The instruction scheduler 235 maintains a record of ready state of each decoded instruction's dependencies (e.g., the instruction's predicate and data operands). When all of the instruction's dependencies (if any) are satisfied, the instruction wakes up and is ready to issue. In some examples, data for instruction dependencies is stored in one or more queues, and instructions are selected as ready-to-issue in at least a partially first-in, first-out basis. Besides the data mux and function unit control signals, the decoded instruction data can encode up to two ready events in the illustrated example. The instruction scheduler 235 accepts these and/or events from other sources (selected for input to the scheduler on inputs T0 and T1 with multiplexers 237 and 238, respectively) and updates the scheduler state data, including ready state data of other instructions in the window. Thus dataflow execution proceeds, starting with the instruction block's ready zero-input instructions, then instructions that these instructions target, and so forth. Some instructions are ready to issue immediately (e.g., move immediate instructions) as they have no dependencies. Depending on the ISA, control structures, and other factors, the decoded instruction store 236 is about 100 bits wide in some examples, and includes information on instruction dependencies, data indicating which target instruction(s)'s active ready state will be set as a result of issuing the instruction.

As used herein, ready state refers to processor state that indicates, for a given instruction, whether and which of its operands (if any) are ready, and whether the instruction itself is now ready for issue. In some examples, ready state includes decoded ready state and active ready state. Decoded ready state data is initialized by decoding instruction(s). Active ready state represents the set of input operands of an instruction that have been evaluated so far during the execution of the current instance of an instruction block. A respective instruction's active ready state is set by executing instruction(s) which target, for example, the left, right, and/or predicate operands of the respective instruction.

Attributes of the instruction window 230 and instruction scheduler 235, such as area, clock period, and capabilities can have significant impact to the realized performance of an EDGE core and the throughput of an EDGE multiprocessor. In some examples, the front end (IF, DC) portions of the microarchitecture can run decoupled from the back end portions of the microarchitecture (IS, EX, LS). In some FPGA implementations, the instruction window 230 is configured to fetch and decode two instructions per clock into the instruction window.

The instruction scheduler 235 has diverse functionality and requirements. It can be highly concurrent. Each clock cycle, the instruction decoder 220 writes decoded ready state and decoded instruction data for one or more instructions into the instruction window 230. Each clock cycle, the instruction scheduler 235 selects the next instruction(s) to issue, and in response the back end sends ready events, for example, target ready events targeting a specific instruction's input slot (e.g., predicate slot, right operand (OP0), or left operand (OP1)), or broadcast ready events targeting all instructions waiting on a broadcast ID. These events cause per-instruction active ready state bits to be set that, together with the decoded ready state, can be used to signal that the corresponding instruction is ready to issue. The instruction scheduler 235 sometimes accepts events for target instructions which have not yet been decoded, and the scheduler can also can also inhibit reissue of issued ready instructions.

Control circuits (e.g., signals generated using the decoded instruction store 236) in the instruction window 230 are used to generate control signals to regulate core operation (including, e.g., control of datapath and multiplexer select signals) and schedule the flow of instructions within the core. This can include generating and using memory access instruction encodings, allocation and de-allocation of cores for performing instruction processing, control of input data and output data between any of the cores 110, register files, the memory interface 140, and/or the I/O interface 150.

In some examples, the instruction scheduler 235 is implemented as a finite state machine coupled to other instruction window logic. In some examples, the instruction scheduler is mapped to one or more banks of RAM in an FPGA, and can be implemented with block RAM, LUT RAM, or other reconfigurable RAM. As will be readily apparent to one of ordinary skill in the relevant art, other circuit structures, implemented in an integrated circuit, programmable logic, or other suitable logic can be used to implement hardware for the instruction scheduler 235. In some examples of the disclosed technology, front-end pipeline stages IF and DC can run decoupled from the back-end pipelines stages (IS, EX, LS).

In the example of FIG. 2, the operand buffers 239 send the data operands, which can be designated left operand (LOP) and right operand (ROP) for convenience, to a set of execution state pipeline registers 245 via one or more switches (e.g., multiplexers 241 and 242). These operands can also be referred to as OP1 and OP0, respectively. A first router 240 is used to send data from the operand buffers 239 to one or more of the functional units 250, which can include but are not limited to, integer ALUs (arithmetic logic units) (e.g., integer ALUs 255), floating point units (e.g., floating point ALU 256), shift/rotate logic (e.g., barrel shifter 257), or other suitable execution units, which can including graphics functions, physics functions, and other mathematical operations. In some examples, a programmable execution unit 258 can be reconfigured to implement a number of different arbitrary functions (e.g., a priori or at runtime).

Data from the functional units 250 can then be routed through a second router (not shown) to a set of load/store pipeline registers 260, to a load/store queue 270 (e.g., for performing memory load and memory store operations), or fed back to the execution pipeline registers, thereby bypassing the operand buffers 239. The load/store queue 270 is coupled to a data cache 275 that caches data for memory operations. The outputs of the data cache 275, and the load/store pipelines registers 260 can be sent to a third router 280, which in turn sends data to the register file 290, the operand buffers 239, and/or the execution pipeline registers 245, according to the instruction being executed in the pipeline stage.

When execution of an instruction block is complete, the instruction block is designated as "committed" and signals from the control outputs can in turn can be used by other cores within the block-based processor 100 and/or by the control unit 160 to initiate scheduling, fetching, and execution of other instruction blocks.

As will be readily understood to one of ordinary skill in the relevant art, the components within an individual core are not limited to those shown in FIG. 2, but can be varied according to the requirements of a particular application. For example, a core may have fewer or more instruction windows, a single instruction decoder might be shared by two or more instruction windows, and the number of and type of functional units used can be varied, depending on the particular targeted application for the block-based processor. Other considerations that apply in selecting and allocating resources with an instruction core include performance requirements, energy usage requirements, integrated circuit die, process technology, and/or cost.

It will be readily apparent to one of ordinary skill in the relevant art that trade-offs can be made in processor performance by the design and allocation of resources within the instruction window and control unit of the processor cores 110. The area, clock period, capabilities, and limitations substantially determine the realized performance of the individual cores 110 and the throughput of the block-based processor 100.

Updates to the visible architectural state of the processor (such as to the register file 290 and the memory) affected by the executed instructions can be buffered locally within the core until the instructions are committed. The control circuitry can determine when instructions are ready to be committed, sequence the commit logic, and issue a commit signal. For example, a commit phase for an instruction block can begin when all register writes are buffered, all writes to memory (including unconditional and conditional stores) are buffered, and a branch target is calculated. The instruction block can be committed when updates to the visible architectural state are complete. For example, an instruction block can be committed when the register writes are written to as the register file, the stores are sent to a load/store unit or memory controller, and the commit signal is generated. The control circuit also controls, at least in part, allocation of functional units to the instructions window.

Because the instruction block is committed (or aborted) as an atomic transactional unit, it should be noted that results of certain operations are not available to instructions within an instruction block. This is in contrast to RISC and CISC architectures that provide results visible on an individual, instruction-by-instruction basis. Thus, additional techniques are disclosed for supporting memory synchronization and other memory operations in a block-based processor environment.

In some examples, block-based instructions can be non-predicated, or predicated true or false. A predicated instruction does not become ready until it is targeted by another instruction's predicate result, and that result matches the predicate condition. If the instruction's predicate does not match, then the instruction never issues.

In some examples, upon branching to a new instruction block, all instruction window ready state (stored in the instruction scheduler 235) is flash cleared (block reset). However when a block branches back to itself (block refresh), only active ready state is cleared; the decoded ready state is preserved so that it is not necessary to re-fetch and decode the blocks instructions. Thus, refresh can be used to save time and energy in loops, instead of performing a block reset. In some examples, a sequence number can be assigned to an instruction block and use to verify whether the decoded ready state is valid for a currently executing instruction block.

Finally, the scheduler design can be scalable across a spectrum of EDGE ISAs. In some examples, each pipeline cycle can accept from one to four decoded instructions and from two to four target ready events, and issue one to two instructions per cycle.

A number of different technologies can be used to implement the instruction scheduler 235. For example, the scheduler 235 can be implemented as an incremental scheduler that keeps ready state in LUT RAM and which updates ready status of about two to four target instructions per cycle. The incremental scheduler updates the ready status as packets of data that are temporarily stored in queues until the respective instruction issues.

The register file 290 may include two or more write ports for storing data in the register file, as well as having a plurality of read ports for reading data from individual registers within the register file. In some examples, a single instruction window (e.g., instruction window 230) can access only one port of the register file at a time, while in other examples, the instruction window 230 can access one read port and one write port, or can access two or more read ports and/or write ports simultaneously. In some examples, the microarchitecture is configured such that not all the read ports of the register 290 can use the bypass mechanism. For the example microarchitecture 200 shown in FIG. 2, the register file can send register data on the bypass path to one of the multiplexers 242 for the operand OP0, but not operand OP1. Thus, for multiple register reads in one cycle, only one operand can use the bypass, while the other register read results are sent to the operand buffers 239, which inserts an extra clock cycle in the instruction pipeline.

In some examples, the register file 290 can include 64 registers, each of the registers holding a word of 32 bits of data. (For convenient explanation, this application will refer to 32-bits of data as a word, unless otherwise specified. Suitable processors according to the disclosed technology could operate with 8-, 16-, 64-, 128-, 256-bit, or another number of bits words) In some examples, some of the registers within the register file 290 may be allocated to special purposes. For example, some of the registers can be dedicated as system registers examples of which include registers storing constant values (e.g., an all zero word), program counter(s) (PC), which indicate the current address of a program thread that is being executed, a physical core number, a logical core number, a core assignment topology, core control flags, execution flags, a processor topology, or other suitable dedicated purpose. In some examples, the register file 290 is implemented as an array of flip-flops, while in other examples, the register file can be implemented using latches, SRAM, or other forms of memory storage. The ISA specification for a given processor specifies how registers within the register file 290 are defined and used.

V. Example Field Programmable Gate Array Architecture

Figure 3:
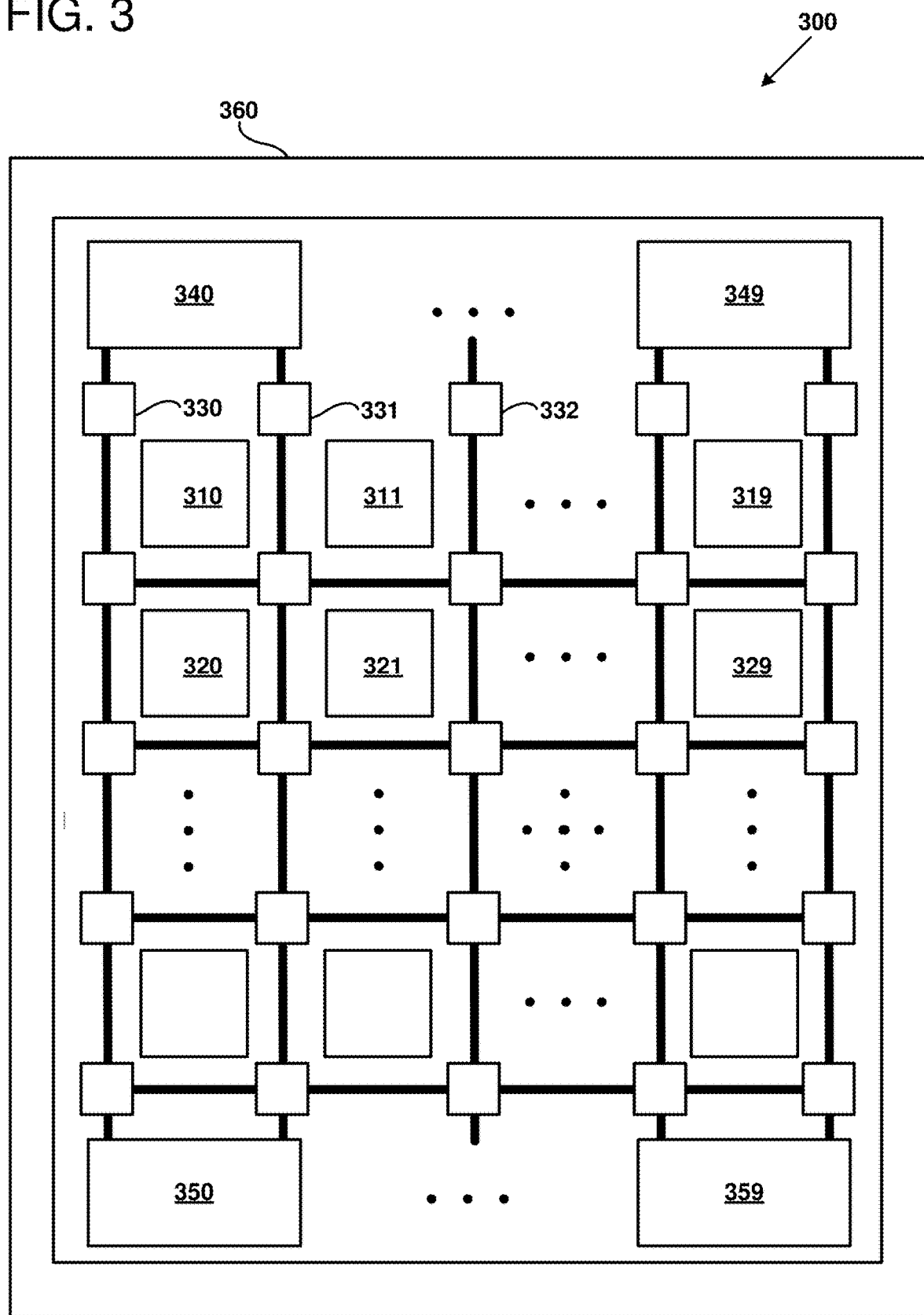
FIG. 3 is a block diagram outlining an example FPGA microarchitecture as can be used in some examples of the disclosed technology.

FIG. 3 is a block diagram 300 that depicts an example field programmable gate array (FPGA) architecture that is configured to implement certain examples of the disclosed technology. For example, the block-based processor 100 discussed above regarding FIG. 1, including those examples that used the microarchitecture 200 depicted in FIG. 2 can be mapped to the FPGA architecture of FIG. 3.

The FPGA includes an array of reconfigurable logic blocks arranged in an array. For example, the FPGA includes a first row of logic blocks, including logic blocks 310, 311, and 319, and a second row of logic blocks including logic blocks 320, 321, and 329. Each of the logic blocks includes logic that can be reconfigured to implement arbitrary logic functions and can also include sequential logic elements such as latches, flip-flops, and memories. The logic blocks are interconnected to each other using a routing fabric that includes a number of interconnect switches that can also be programmable. For example, there is a first row of switch blocks 330, 331, 332, etc., positioned between the first row of reconfigurable logic blocks and the second row of reconfigurable logic blocks. The switches can be configured in order to change wire connections that carry signals between the reconfigurable logic blocks. For example, instructions schedulers, functional units, pipeline buffers, and operand buffers can be mapped to the logic blocks connected using the switch blocks of FIG. 3.

The FPGA also includes a number of more complex components. For example, the logic block includes a number of block RAMs, for example, block RAM 340 and block RAM 349. The block RAMs typically contain a larger number of memory bits, for example, a few thousand memory bits that are accessed by applying an address to the memory, and reading from one or more read ports. In some examples, the block RAMs can include two or more write ports and two or more read ports. In other examples, the block RAMs may only have a single read and/or a single write port. While the block RAMs are typically accessed by applying an address and reading corresponding data, in some examples, the block RAMs can be configured with additional circuitry that allows for implementation of more complex functions including shift registers and First-In First-Out (FIFO) buffers.

The illustrated FPGA also includes a number of hard macro blocks including hard macro block 350 and hard macro block 359. These macro blocks can include more complex functionality such as processor functionality, digital signal processing functionality, accelerators, or other functions deemed to be desirable. The FPGA is further surrounded by an I/O ring 360 that can be coupled to the logic blocks, the block rams, and/or the hard macro blocks in order to receive and send signals to components away from the FPGA. In some examples, the I/O signals are full rail voltage signals, while other examples, differential signals are used. In some examples, the I/O ports can be multiplexed (e.g. time-multiplexed) in order to support input and output of more signals than the number of pins available on the FPGA.

While many examples of FPGAs are typically reconfigurable an arbitrary number of times through the use of electrically erasable memories, in other examples, one-time programmable logic elements can be used. For example, the logic blocks and switches can be programmed with the use of fuses, anti-fuses, or with a ROM mask to program a logic function once that is not easily reversible.

In the reconfigurable case, the FPGA typically has a configuration port that receives data according to a file dubbed a bitstream, or a configuration bitstream. The bitstream data is read into the device and used to program and configure the logic blocks, the switches, the block rams, and/or the hard macros. When a new design is desired, the configuration can be erased and a new design configured into the device. In some examples, the FPGA can be partially reconfigured in order to save on programming time. For example, a subset of the logic blocks, the switches, or block rams can be dynamically reconfigured in the field without reprogramming the entire device.

One challenge for block-based processor implementations mapped onto reconfigurable logic is determining microarchitectural structures that can be efficiently implemented using the available blocks of a custom or off-the-shelf device. However, using the disclosed technologies, higher performance, and/or more efficient structures can be implemented. Further, it should be readily understood that while some examples of the FPGAs are a stand-alone integrated circuit, in other examples, the FPGA may be packaged differently, for example, in a multi-chip module (MCM), or on the same circuit die as a custom or basic system-on-chip (SoC).

Figure 4:
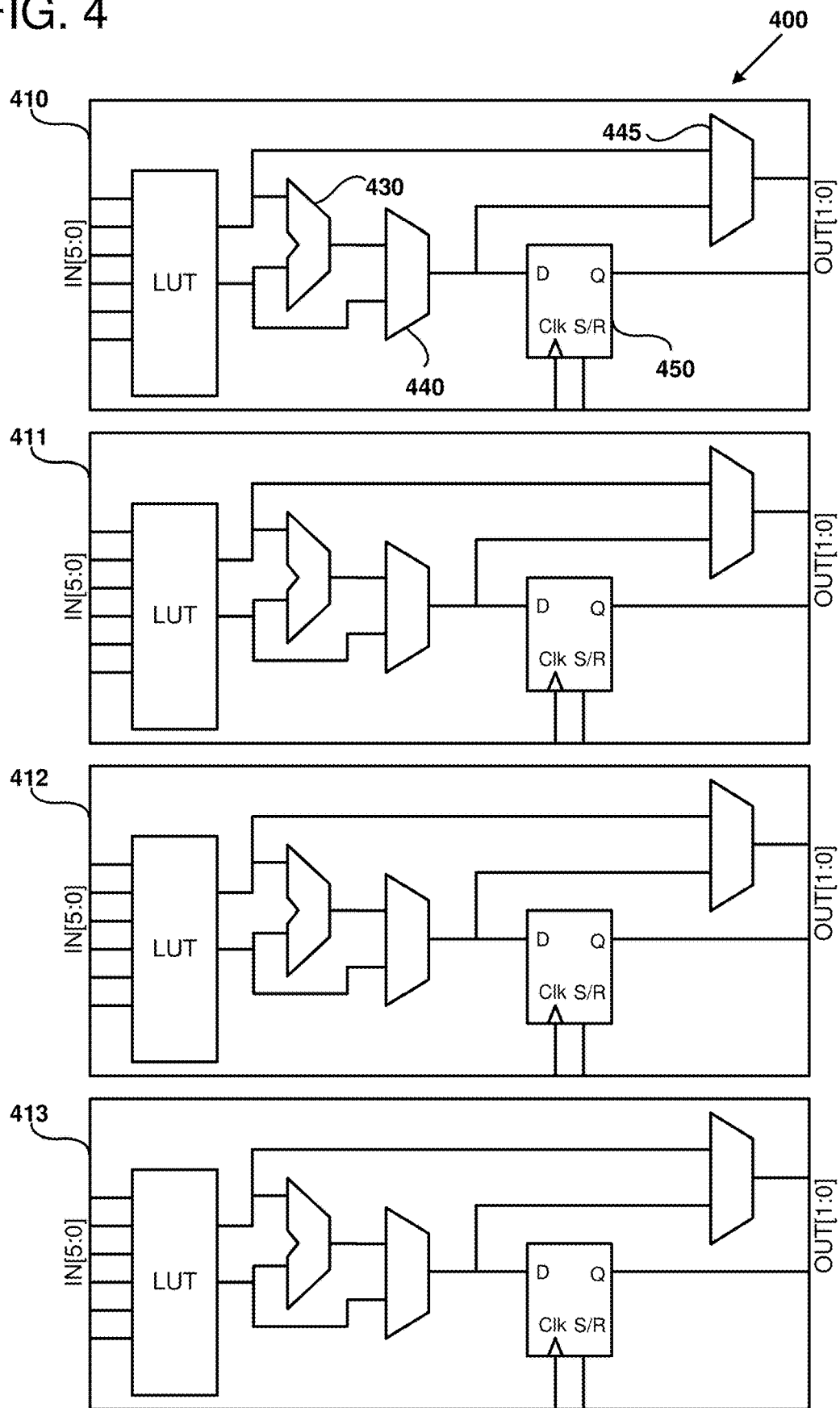
FIG. 4 illustrates example reconfigurable logic in a reconfigurable logic block as can be used in certain examples of the disclosed technology.

FIG. 4 is a block diagram 400 illustrating four reconfigurable logic blocks 410, 411, 412, and 413 that can configured to form part of the logic fabric of an example FPGA-integrated circuit. The components inside the reconfigurable logic blocks shown are identical, or homogenous, but it should be readily understood, in other examples, more than one type of reconfigurable logic block may be present on a single FPGA.

A first reconfigurable logic block 410 includes a six-input Look Up Table (LUT) 420 that is coupled to carry logic 430, a number of multiplexers 440 and 445, and a storage element (here, a D flip-flop) 450. The LUT 420 can be implemented using a small memory (for example, a memory having six address bits and two output bits as shown). Thus, any six-input Boolean function can be implemented by using a single LUT. In some examples, outputs of LUTs can be combined, or a reconfigurable logic block can have multiple LUTs that can be connected together in order to perform more complex logic functions. In some examples, common logic functions can be providing in addition to the LUT. For example, the carry logic 430 can be configured to be a half-adder or a full-adder, thereby providing additional logic in a compact footprint. The multiplexers are used to select various output from other components. For example, the multiplexer 440 can be used to perform the carry propagation logic for an adder, while the multiplexer 445 can be used to select another output of the LUT 420 or the carry logic 430. In some examples, the multiplexer is used to either select a sequential output of a state element (e.g. flip-flop 450), or a combinational output of a Look Up Table. It should be readily understood to one of ordinary skill in the art that different logic functions, LUT sizes, and sequential elements can be employed in a reconfigurable logic element. Thus, techniques for mapping block-based processors to such reconfigurable logic can vary depending on the specific target FPGA architecture. The configuration of the logic inside the reconfigurable logic block can be programmed using the configuration port of the FPGA. In some examples, the LUTs are not programmed once, but can be configured to act as small memories that store certain data used in the block-based processor.

In some examples of the disclosed technology, a logic synthesis tool (logic compiler) is used to transform a specification for a block-processor into a configuration bitstream that can be applied to a configuration port of an FPGA to configure logic to implement a block-based processor. In some examples, the designer can use an RPM (relationally placed macro) methodology to improve area and interconnect delays and achieve a repeatable layout for easy routing and timing closure under module composition and massive replication. For example, by including structural RTL instantiating modules and tiling them into a scheduler, logic for the instruction scheduler can be locked to a set of single LUTs, allow for a compact clustering and placement of logic within the FPGA.

VI. Example Stream of Instruction Blocks

Figure 5:
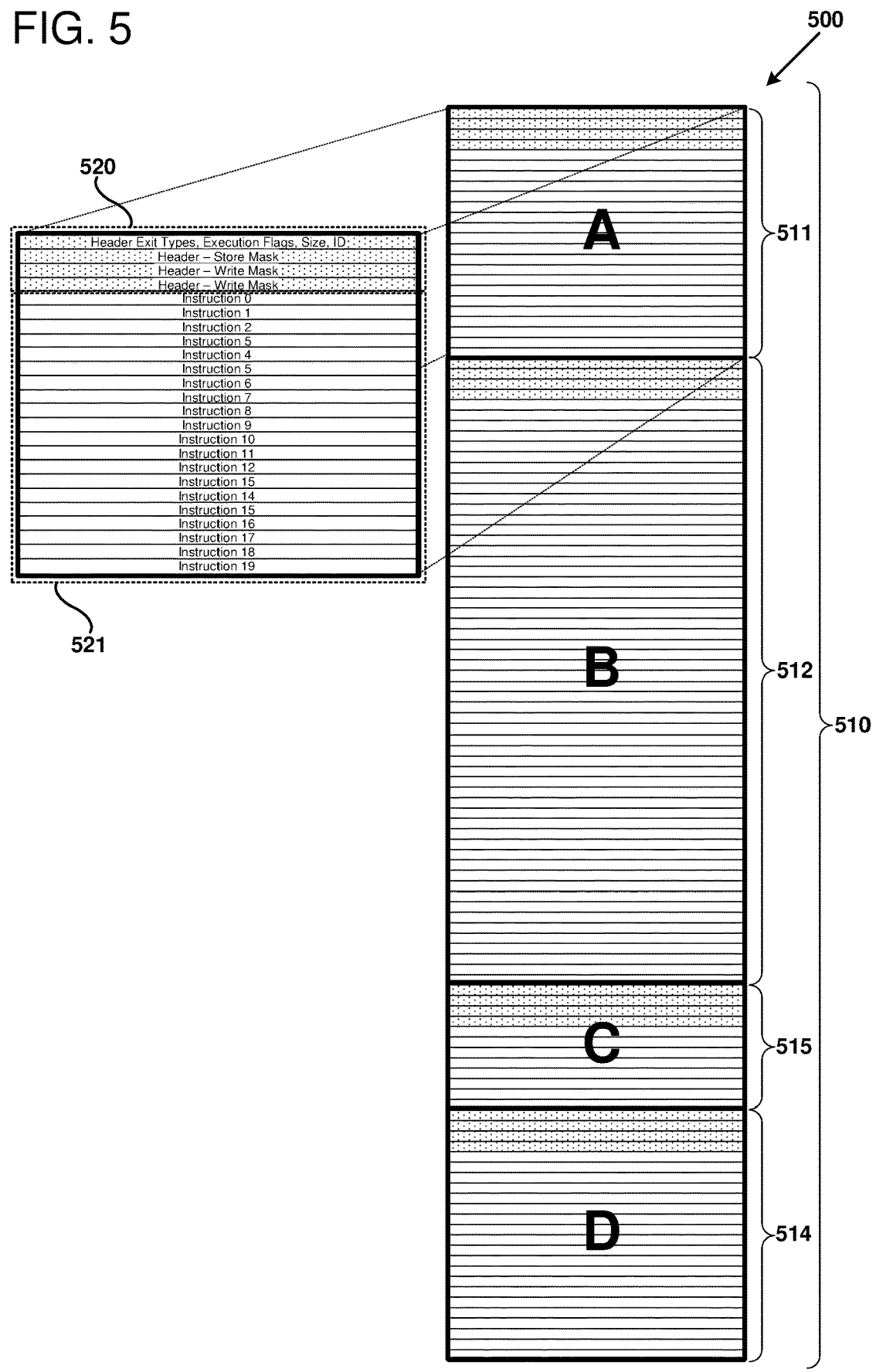
FIG. 5 illustrates example block-based processor headers and instructions as can be used in some examples of the disclosed technology.

Turning now to the diagram 500 of FIG. 5, a portion 510 of a stream of block-based instructions, including a number of variable length instruction blocks 511-514 is illustrated. The stream of instructions can be used to implement user application, system services, or any other suitable use. The stream of instructions can be stored in memory, received from another process in memory, received over a network connection, or stored or received in any other suitable manner. In the example shown in FIG. 5, each instruction block begins with an instruction header, which is followed by a varying number of instructions. For example, the instruction block 511 includes a header 520 and twenty instructions 521. The particular instruction header 520 illustrated includes a number of data fields that control, in part, execution of the instructions within the instruction block, and also allow for improved performance enhancement techniques including, for example branch prediction, speculative execution, lazy evaluation, and/or other techniques. The instruction header 520 also includes an indication of the instruction block size. The instruction block size can be in larger chunks of instructions than one, for example, the number of 4-instruction chunks contained within the instruction block. In other words, the size of the block is shifted 4 bits in order to compress header space allocated to specifying instruction block size. Thus, a size value of 0 indicates a minimally-sized instruction block which is a block header followed by four instructions. In some examples, the instruction block size is expressed as a number of bytes, as a number of words, as a number of n-word chunks, as an address, as an address offset, or using other suitable expressions for describing the size of instruction blocks. In some examples, the instruction block size is indicated by a terminating bit pattern in the instruction block header and/or footer.

The instruction block header 520 can also include one or more execution flags that indicate one or more modes of operation for executing the instruction block. For example, the modes of operation can include core fusion operation, vector mode operation, memory dependence prediction, and/or in-order or deterministic instruction execution. Further, the execution flags can include a block synchronization flag that inhibits speculative execution of the instruction block.

In some examples of the disclosed technology, the instruction header 520 includes one or more identification bits that indicate that the encoded data is an instruction header. For example, in some block-based processor ISAs, a single ID bit in the least significant bit space is always set to the binary value 1 to indicate the beginning of a valid instruction block. In other examples, different bit encodings can be used for the identification bit(s). In some examples, the instruction header 520 includes information indicating a particular version of the ISA for which the associated instruction block is encoded.

The block instruction header can also include a number of block exit types for use in, for example, branch prediction, control flow determination, and/or branch processing. The exit type can indicate what the type of branch instructions are, for example: sequential branch instructions, which point to the next contiguous instruction block in memory; offset instructions, which are branches to another instruction block at a memory address calculated relative to an offset; subroutine calls, or subroutine returns. By encoding the branch exit types in the instruction header, the branch predictor can begin operation, at least partially, before branch instructions within the same instruction block have been fetched and/or decoded.

The illustrated instruction block header 520 also includes a store mask that indicates which of the load-store queue identifiers encoded in the block instructions are assigned to store operations. The instruction block header can also include a write mask, which identifies which global register(s) the associated instruction block will write. In some examples, the store mask is stored in a store vector register by, for example, an instruction decoder (e.g., decoder 220). In other examples, the instruction block header 520 does not include the store mask, but the store mask is generated dynamically by the instruction decoder by analyzing instruction dependencies when the instruction block is decoded. For example, the decoder can generate load store identifiers for instruction block instructions to determine a store mask and store the store mask data in a store vector register. Similarly, in other examples, the write mask is not encoded in the instruction block header, but is generated dynamically (e.g., by analyzing registers referenced by instructions in the instruction block) by an instruction decoder) and stored in a write mask register. The write mask can be used to determine when execution of an instruction block has completed and thus to initiate commitment of the instruction block. The associated register file must receive a write to each entry before the instruction block can complete. In some examples a block-based processor architecture can include not only scalar instructions, but also single-instruction multiple-data (SIMD) instructions, that allow for operations with a larger number of data operands within a single instruction.

Examples of suitable block-based instructions that can be used for the instructions 521 can include instructions for executing integer and floating-point arithmetic, logical operations, type conversions, register reads and writes, memory loads and stores, execution of branches and jumps, and other suitable processor instructions. In some examples, the instructions include instructions for configuring the processor to operate according to one or more of operations by, for example, speculative. Because an instruction's dependencies are encoded in the instruction block (e.g., in the instruction block header, other instructions that target the instruction, and/or in the instruction itself), instructions can issue and execute out of program order when the instruction's dependencies are satisfied.

VII. Example Block Instruction Target Encoding

Figure 6:
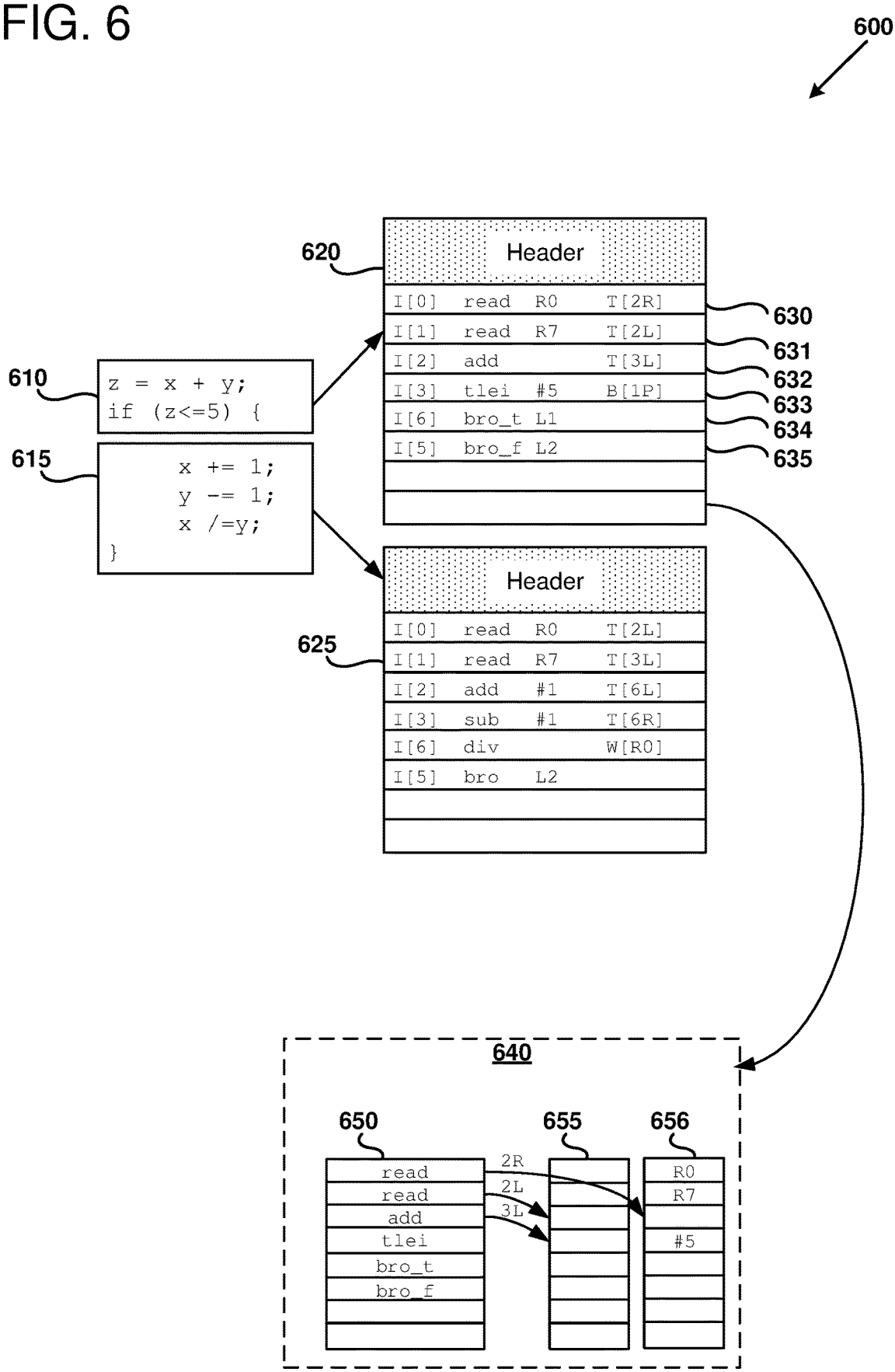
FIG. 6 illustrates an example source code portion and corresponding instruction blocks as can be used in certain examples of the disclosed technology.

FIG. 6 is a diagram 600 depicting an example of two portions 610 and 615 of C language source code and their respective instruction blocks 620 and 625, illustrating how block-based instructions can explicitly encode their targets. In this example, the first two READ instructions 630 and 631 target the right (T[2R]) and left (T[2L]) operands, respectively, of the ADD instruction 632 (2R indicates targeting the right operand of instruction number 2; 2L indicates the left operand of instruction number 2). In the illustrated ISA, the read instruction is the only instruction that reads from the global register file (e.g., register file 290); however any instruction can target the global register file. When the ADD instruction 632 receives the results of both register reads it will become ready and execute. It is noted that the present disclosure sometimes refers to the right operand as OP0 and the left operand as OP1.

When the TLEI (test-less-than-equal-immediate) instruction 633 receives its single input operand from the ADD, it will become ready to issue and execute. The test then produces a predicate operand that is broadcast on channel one (B [1P]) to all instructions listening on the broadcast channel for the predicate, which in this example are the two predicated branch instructions (BRO_T 634 and BRO_F 635). The branch instruction that receives a matching predicate will issue, but the other instruction, encoded with the complementary predicated, will not issue.

A dependence graph 640 for the instruction block 620 is also illustrated, as an array 650 of instruction nodes and their corresponding operand targets 655 and 656. This illustrates the correspondence between the block instructions 620, the corresponding instruction window entries, and the underlying dataflow graph represented by the instructions. Here decoded instructions READ 630 and READ 631 are ready to issue, as they have no input dependencies. As they issue and execute, the values read from registers R0 and R7 are written into the right and left operand buffers of ADD 632, marking the left and right operands of ADD 632 "ready." As a result, the ADD 632 instruction becomes ready, issues to an ALU, executes, and the sum is written to the left operand of the TLEI instruction 633.

VIII. Example Block-Based Instruction Formats

Figure 7:
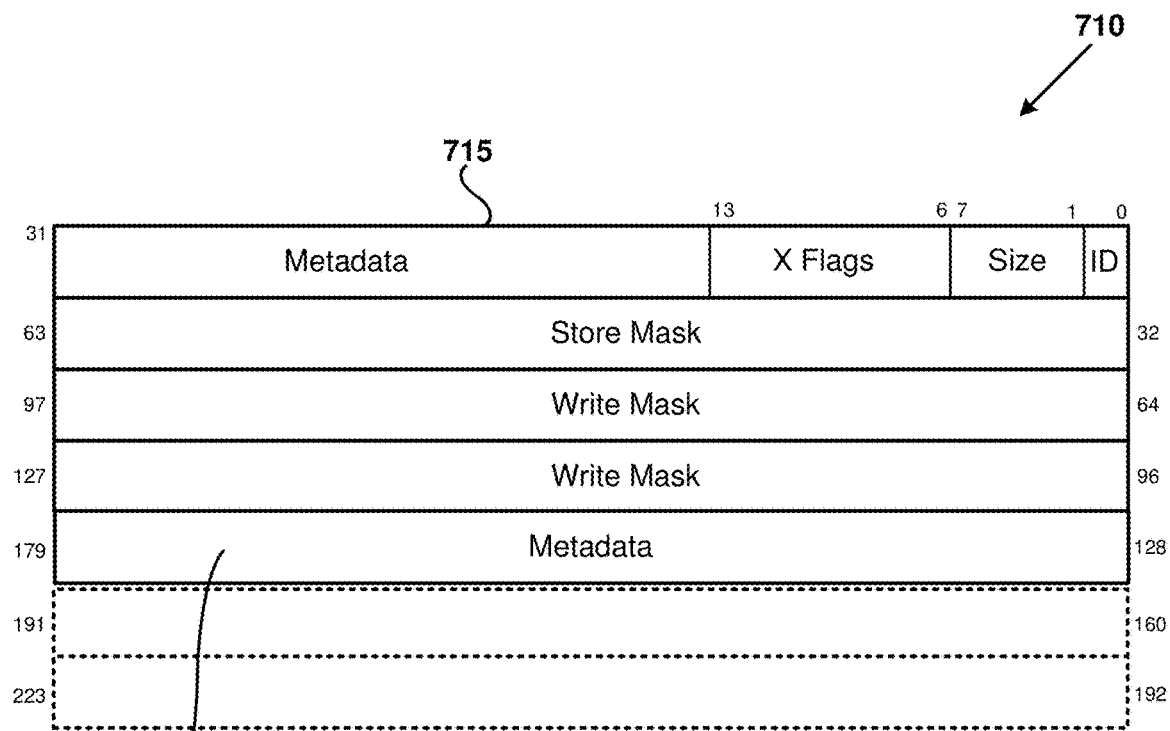
FIG. 7 illustrates an example of instruction formats that can be used for certain examples of block-based processors according to the disclosed technology.
Figure 7:
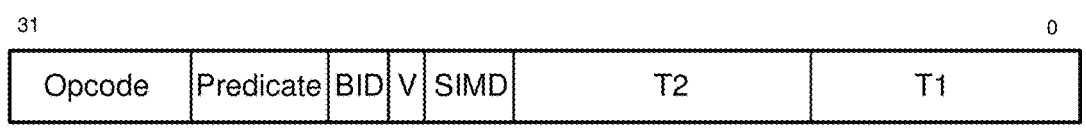
Figure 7:
Figure 7:
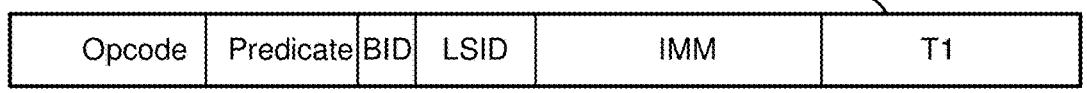

FIG. 7 is a diagram illustrating generalized examples of instruction formats for an instruction header 710, a generic instruction 720, a branch instruction 730, and a memory access instruction 740 (e.g., a memory load or store instruction). The instruction formats can be used for instruction blocks executed according to a number of execution flags specified in an instruction header that specify a mode of operation. Each of the instruction headers or instructions is labeled according to the number of bits. For example the instruction header 710 includes four 32-bit words and is labeled from its least significant bit (lsb) (bit 0) up to its most significant bit (msb) (bit 127). As shown, the instruction header includes a write mask field, a number of execution flag fields, an instruction block size field, and an instruction header ID bit (the least significant bit of the instruction header). In some examples, the instruction header 710 includes additional metadata 715 and/or 716, which can be used to control additional aspects of instruction block execution and performance.

The execution flag fields depicted in FIG. 7 occupy bits 6 through 13 of the instruction block header 710 and indicate one or more modes of operation for executing the instruction block. For example, the modes of operation can include core fusion operation, vector mode operation, branch predictor inhibition, memory dependence predictor inhibition, block synchronization, break after block, break before block, block fall through, and/or in-order or deterministic instruction execution. The block synchronization flag occupies bit 9 of the instruction block and inhibits speculative execution of the instruction block when set to logic 1. Inhibiting speculative execution is highly desirable for example, when shared memory operations such as store conditional instructions or other share memory operations are performed by an instruction block to prevent memory hazards in violation of the ISA specification.

The exit type fields include data that can be used to indicate the types of control flow instructions encoded within the instruction block. For example, the exit type fields can indicate that the instruction block includes one or more of the following: sequential branch instructions, offset branch instructions, indirect branch instructions, call instructions, and/or return instructions. In some examples, the branch instructions can be any control flow instructions for transferring control flow between instruction blocks, including relative and/or absolute addresses, and using a conditional or unconditional predicate. The exit type fields can be used for branch prediction and speculative execution in addition to determining implicit control flow instructions.

The illustrated generic block instruction 720 is stored as one 32-bit word and includes an opcode field, a predicate field, a broadcast ID field (BID), a vector operation field (V), a single instruction multiple data (SIMD) field, a first target field (T1), and a second target field (T2). For instructions with more consumers than target fields, a compiler can build a fanout tree using move instructions, or it can assign high-fanout instructions to broadcasts. Broadcasts support sending an operand over a lightweight network to any number of consumer instructions in a core.

While the generic instruction format outlined by the generic instruction 720 can represent some or all instructions processed by a block-based processor, it will be readily understood by one of skill in the art that, even for a particular example of an ISA, one or more of the instruction fields may deviate from the generic format for particular instructions. The opcode field specifies the operation(s) performed by the instruction 720, such as memory read/write, register load/store, add, subtract, multiply, divide, shift, rotate, system operations, or other suitable instructions. The predicate field specifies the condition under which the instruction will execute. For example, the predicate field can specify the value "true," and the instruction will only execute if a corresponding condition flag matches the specified predicate value. In some examples, the predicate field specifies, at least in part, which is used to compare the predicate, while in other examples, the execution is predicated on a flag set by a previous instruction (e.g., the preceding instruction in the instruction block). In some examples, the predicate field can specify that the instruction will always, or never, be executed. Thus, use of the predicate field can allow for denser object code, improved energy efficiency, and improved processor performance, by reducing the number of branch instructions.

The target fields T1 and T2 specify the instructions to which the results of the block-based instruction are sent using an instruction identifier (IID). For example, an ADD instruction at instruction slot 7 can specify that its computed result will be sent to instructions at slots 3 and 10, (00011b and 01010b, in a five-bit encoding) including specification of the operand slot (e.g., left operation, right operand, or predicate operand). Depending on the particular instruction and ISA, one or both of the illustrated target fields can be replaced by other information, for example, the first target field T1 can be replaced by an immediate operand, an additional opcode, specify two targets, etc.

The branch instruction 730 includes an opcode field, a predicate field, a broadcast ID field (BID), and an offset field. The opcode and predicate fields are similar in format and function as described regarding the generic instruction. The offset can be expressed in units of groups of four instructions, thus extending the memory address range over which a branch can be executed. The predicate shown with the generic instruction 720 and the branch instruction 730 can be used to avoid additional branching within an instruction block. For example, execution of a particular instruction can be predicated on the result of a previous instruction (e.g., a comparison of two operands). If the predicate is false, the instruction will not commit values calculated by the particular instruction. If the predicate value does not match the required predicate, the instruction does not issue. For example, a BRO_F (predicated false) instruction will issue if it is sent a false predicate value.

It should be readily understood that, as used herein, the term "branch instruction" is not limited to changing program execution to a relative memory location, but also includes jumps to an absolute or symbolic memory location, subroutine calls and returns, and other instructions that can modify the execution flow. In some examples, the execution flow is modified by changing the value of a system register (e.g., a program counter PC or instruction pointer), while in other examples, the execution flow can be changed by modifying a value stored at a designated location in memory. In some examples, a jump register branch instruction is used to jump to a memory location stored in a register. In some examples, subroutine calls and returns are implemented using jump and link and jump register instructions, respectively.

The memory access instruction 740 format includes an opcode field, a predicate field, a broadcast ID field (BID), an immediate field (IMM), and a target field (T1). The opcode, broadcast, predicate fields are similar in format and function as described regarding the generic instruction. For example, execution of a particular instruction can be predicated on the result of a previous instruction (e.g., a comparison of two operands). If the predicate is false, the instruction will not commit values calculated by the particular instruction. If the predicate value does not match the required predicate, the instruction does not issue. The immediate field can be used as an offset for the operand sent to the load or store instruction. The operand plus (shifted) immediate offset is used as a memory address for the load/store instruction (e.g., an address to read data from, or store data to, in memory). For some instructions, such as a store conditional instruction, the target field T1 745 is used to specify where a status indicator generated by executing will be stored. For example, the target field T1 745 can specify a register to store a status indicator value that indicates whether the store conditional instruction executed successfully or not (e.g., based on the load link address and link values). A subsequent instruction block can check the status indicator value and take appropriate action (e.g., by flushing an instruction block, causing the instruction block to re-execute, raising an exception, etc.).

IX. Example Processor State Diagram

Figure 8:
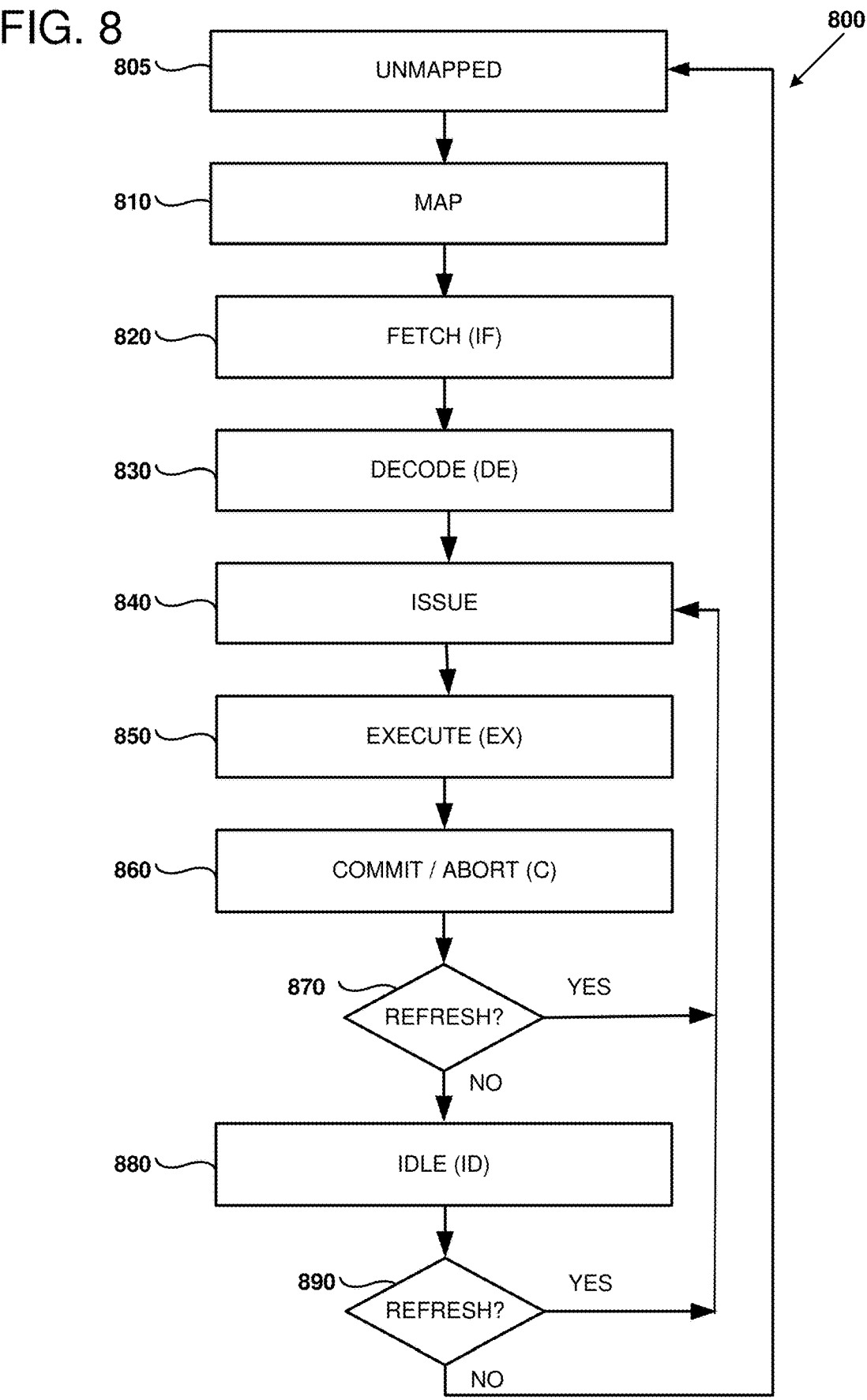
FIG. 8 is a flow chart illustrating an example of a progression of execution states of a processor core in a block-based processor, as can be used in certain examples of the disclosed technology.

FIG. 8 is a state diagram 800 illustrating number of states assigned to an instruction block as it is mapped, executed, and retired. For example, one or more of the states can be assigned during execution of an instruction according to one or more execution flags. It should be readily understood that the states shown in FIG. 8 are for one example of the disclosed technology, but that in other examples an instruction block may have additional or fewer states, as well as having different states than those depicted in the state diagram 800. At state 805, an instruction block is unmapped. The instruction block may be resident in memory coupled to a block-based processor, stored on a computer-readable storage device such as a hard drive or a flash drive, and can be local to the processor or located at a remote server and accessible using a computer network. The unmapped instructions may also be at least partially resident in a cache memory coupled to the block-based processor.

At instruction block map state 810, control logic for the block-based processor, such as an instruction scheduler, can be used to monitor processing core resources of the block-based processor and map the instruction block to one or more of the processing cores.

The control unit can map one or more of the instruction block to processor cores and/or instruction windows of particular processor cores. In some examples, the control unit monitors processor cores that have previously executed a particular instruction block and can re-use decoded instructions for the instruction block still resident on the "warmed up" processor core. Once the one or more instruction blocks have been mapped to processor cores, the instruction block can proceed to the fetch state 820.

When the instruction block is in the fetch state 820 (e.g., instruction fetch), the mapped processor core fetches computer-readable block instructions from the block-based processors' memory system and loads them into a memory associated with a particular processor core. For example, fetched instructions for the instruction block can be fetched and stored in an instruction cache within the processor core. The instructions can be communicated to the processor core using core interconnect. Once at least one instruction of the instruction block has been fetched, the instruction block can enter the instruction decode state 830.

During the instruction decode state 830, various bits of the fetched instruction are decoded into signals that can be used by the processor core to control execution of the particular instruction, including generation of identifiers indicating relative ordering of memory access instructions. For example, the decoded instructions can be stored in one of the memory stores shown above, in FIG. 2. The decoding includes generating dependencies for the decoded instruction, operand information for the decoded instruction, and targets for the decoded instruction. Once at least one instruction of the instruction block has been decoded, the instruction block can proceed to issue state 840.

During the issue state 840, instruction dependencies are evaluated to determine if an instruction is ready for execution. For example, an instruction scheduler can monitor an instruction's source operands and predicate operand (for predicated instructions) must be available before an instruction is ready to issue. For some encodings, certain instructions also must issue according to a specified ordering. For example, memory load store operations are ordered according to an LSID value encoded in each instruction. In some examples, more than one instruction is ready to issue simultaneously, and the instruction scheduler selects one of the ready to issue instructions to issue. Instructions can be identified using their IID to facilitate evaluation of instruction dependencies. Once at least one instruction of the instruction block has issued, source operands for the issued instruction(s) can be fetched (or sustained on a bypass path), and the instruction block can proceed to execution state 850.

During the execution state 850, operations associated with the instruction are performed using, for example, functional units 260 as discussed above regarding FIG. 2. As discussed above, the functions performed can include arithmetical functions, logical functions, branch instructions, memory operations, and register operations. Control logic associated with the processor core monitors execution of the instruction block, and once it is determined that the instruction block can either be committed, or the instruction block is to be aborted, the instruction block state is set to commit/abort 860. In some examples, the control logic uses a write mask and/or a store mask for an instruction block to determine whether execution has proceeded sufficiently to commit the instruction block.

At the commit/abort state 860, the processor core control unit determines that operations performed by the instruction block can be completed. For example memory load store operations, register read/writes, branch instructions, and other instructions will definitely be performed according to the control flow of the instruction block. For conditional memory instructions, data will be written to memory, and a status indicator value that indicates success generated during the commit/abort state 860. Alternatively, if the instruction block is to be aborted, for example, because one or more of the dependencies of instructions are not satisfied, or the instruction was speculatively executed on a predicate for the instruction block that was not satisfied, the instruction block is aborted so that it will not affect the state of the sequence of instructions in memory or the register file. Regardless of whether the instruction block has committed or aborted, the instruction block goes to state 870 to determine whether the instruction block should be refreshed. If the instruction block is refreshed, the processor core re-executes the instruction block, typically using new data values, particularly the registers and memory updated by the just-committed execution of the block, and proceeds directly to the execute state 850. Thus, the time and energy spent in mapping, fetching, and decoding the instruction block can be avoided. Alternatively, if the instruction block is not to be refreshed, then the instruction block enters an idle state 880.

In the idle state 880, the processor core executing the instruction block can be idled by, for example, powering down hardware within the processor core, while maintaining at least a portion of the decoded instructions for the instruction block. At some point, the control unit determines 890 whether the idle instruction block on the processor core is to be refreshed or not. If the idle instruction block is to be refreshed, the instruction block can resume execution of instructions at issue state 840. Alternatively, if the instruction block is not to be refreshed, then the instruction block is unmapped and the processor core can be flushed and subsequently instruction blocks can be mapped to the flushed processor core.

While the state diagram 800 illustrates the states of an instruction block as executing on a single processor core for ease of explanation, it should be readily understood to one of ordinary skill in the relevant art that in certain examples, multiple processor cores can be used to execute multiple instances of a given instruction block, concurrently.

X. Example Instruction Scheduler Bank

Figure 9:
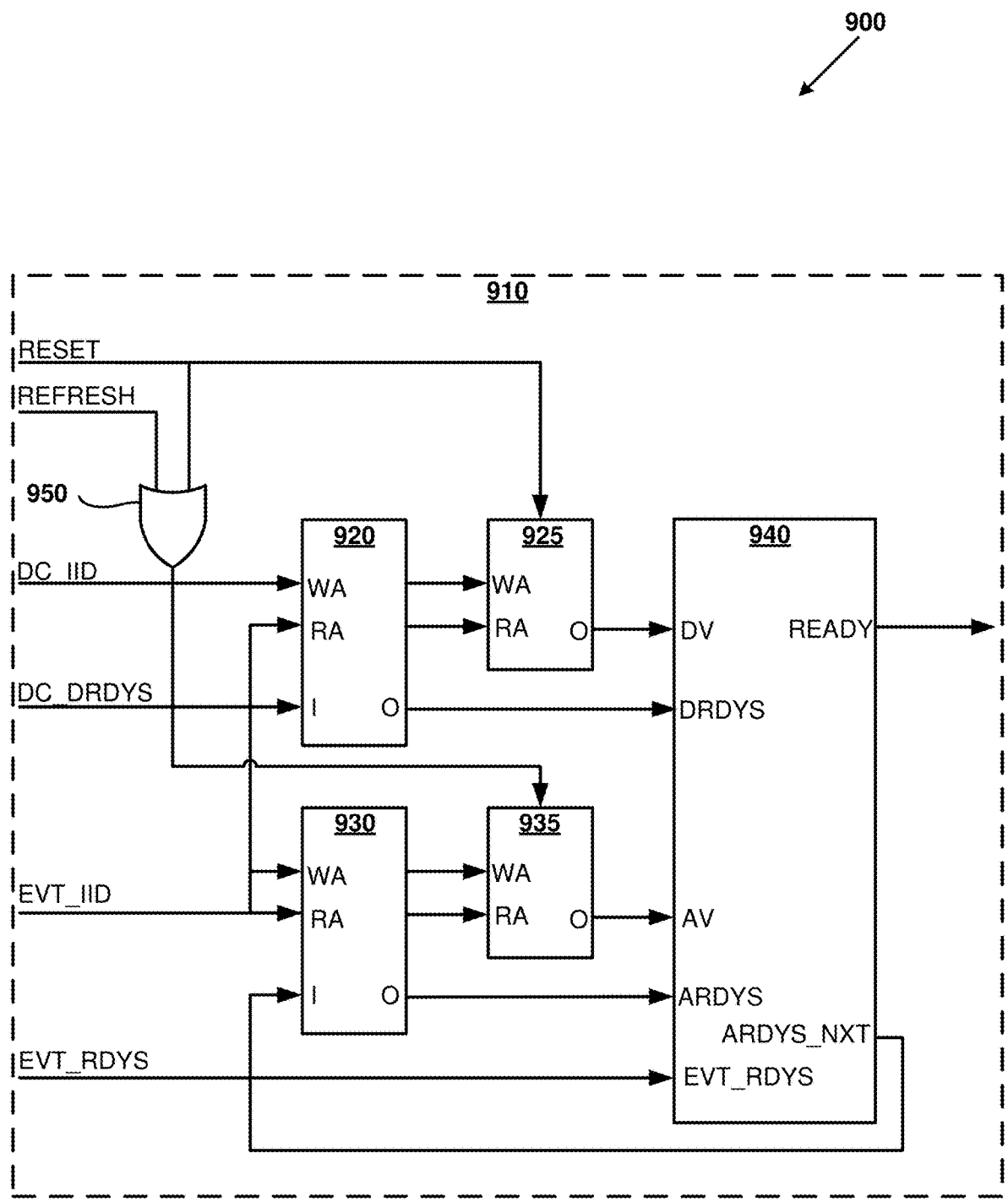
FIG. 9 is a block diagram outlining an example instruction scheduler bank, as can be used in certain examples of the disclosed technology.

FIG. 9 is a block diagram 900 illustrating an example 16-entry instruction scheduler bank that can be used in certain examples of the disclosed technology. For example, the instruction scheduler 235, discussed above regarding FIG. 2, can include one or more of the illustrated scheduler banks 910. In some examples, the scheduler bank 910 is implemented using reconfigurable resources of a reconfigurable logic device. For example, FPGA components such as LUT RAMs, flip-flops, multiplexers, arithmetic and carry units, and other such logic components can be used to advantageously map the scheduler bank with an efficient and/or energy-efficient composition of devices.

As shown, scheduler bank 910 includes a LUT RAM 920 storing decoded ready state for each instruction (DRDYSS) 920 and a LUT RAM 930 storing active ready state set (ARDYSS) for each instruction. Each of the DRDYSS LUT RAM 920 and the ARDYSS LUT RAM 930 is coupled to an array of flip-flops 925 and 935, respectively, wherein each flip-flop stores valid entry information for a corresponding entry of the respective LUT RAMs. The DRDYSS LUT RAM 920 receives as input the decoded instruction ID on its write address input. When instructions of an instruction block are decoded, the DC_IID is used to select a memory address location within the DRDYSS LUT RAM to store ready state data indexed by an instruction identifier for each instruction decoded from the instruction block. When the scheduler bank is used to read the decoded ready state data stored in the DRDYSS LUT RAM 920, the event identifier (EVT_IID) is applied to the read address port of the LUT RAM 920. The write address and read address are used to index and select one of the set of flip-flops 925, which stores a bit value indicating whether the ready state data stored in the corresponding instruction's entry in LUT RAM 920 is valid or invalid. If the values are designated as valid, then a valid bit DV is output by the selected DRDYSS flip-flop 925. Conversely, if the selected IID entry is not yet valid (e.g., has not been written since it was last cleared), then the selected DRDYSS flip-flop 925 will output a 0 and the downstream logic 940 will thus interpret received any value received from the LUT RAM 920 as all zeroes—as if it had actually had its internal values reset. As shown, the input DC_IID is used to specify the write address ("WA") within the array of flip-flops 925 when decoded ready state is written by decoder 220. Similarly, the ARDYSS LUT RAM 930 is written and read by applying an instruction ID address labeled EVT_IID corresponding to a field of a target ready event from multiplexer 1130 or 1135. The ARDYSS LUT RAM 930 is coupled to the array of valid flip-flops 935 which will output an invalid value to AV if the selected address (EVT_IID) is marked as invalid, or conversely, output the value read from the LUT RAM to the AV input of the ready logic unit 940. Each of the flip-flop arrays can be cleared in a single cycle using a single signal. The DRDYSS array of flip-flops 925 are reset with application of the RESET SIGNAL, while the ARDYSS array of flip-flops 935 is reset with application of a signal generated by ORing the RESET signal with a REFRESH signal with an OR gate 950. This composition of the scheduler bank 910 therefore allows for active ready state to be refreshed (e.g., cleared upon executed a new instance of the same instructional block), while the reset signal is used to clear both the decoded ready state data and the active ready state data.

The ready logic unit 940 includes logic for generating a ready signal for the applied instruction identifier input EVT_IID. Based on the values of the coded ready state and the active ready state, a 1 or a 0 is output as the ready value to indicate whether the selected instruction is ready to issue. The ready logic 940 also calculates the ARDYSS_NEXT vector, which is a bit vector that includes updated active ready state values for the specific target instruction identified by EVT_IID. Thus, as events are received by the scheduler bank 910, active ready state is updated. In some examples, each of the LUT RAMs 920 and 930 output a 4-bit wide value. In other examples, different bit widths of values are selected based on the amount of ready state data for each instruction, as well as the width of LUT RAMs available in a particular reconfigurable logic device. Use of the set of valid flip-flops 925 and 935 allows for operation of a resettable memory including in cases where an implementation of a RAM with a built in reset operation may consume large amounts of resources and/or consume additional energy. For example, many FPGA vendor designs do not include an array reset function in their LUT RAMs. Thus, the flip-flop sets 925 and 935 provide an economical structure for providing reset, without inducing additional FPGA resource consumption or delays in the scheduler bank.

The ready logic 940 includes logic for logically ORing a portion of the ready state data, the active ready state data, and event data corresponding to the instruction block to produce an ORed version and then bitwise ANDing the ORed portion to determine whether the instruction is ready to issue. An example of Verilog hardware description language code for implementing a portion of such ready logic 940 is provided below in Table 1. In other examples, logic to generate NEXT RDYS signals can be expressed in other forms, including using schematic capture, netlists, or other suitable formats for expressing logic.

TABLE 1

```
// ready logic
always @* begin
    ARDYS_NXT   = (DV ? DRDYS   : 4'b0000)
                | (AV ? ARDYS   : 4'b0000)
```

TABLE 1-continued

```
                | EVT_RDYS;
    READY = &ADRYS_NXT;
end
```

As shown in Table 1, the readiness of the instruction is obtained by combining the decoded readys DRDYS validated by DV, the active readys ARDYS validated by AV, and the target ready events bit vector EVT_RDYS. If the AND-reduction of the OR of these three-bit vectors is logic one (1), then every input dependency of the subject instruction is satisfied and it becomes ready to issue.

Figure 10:
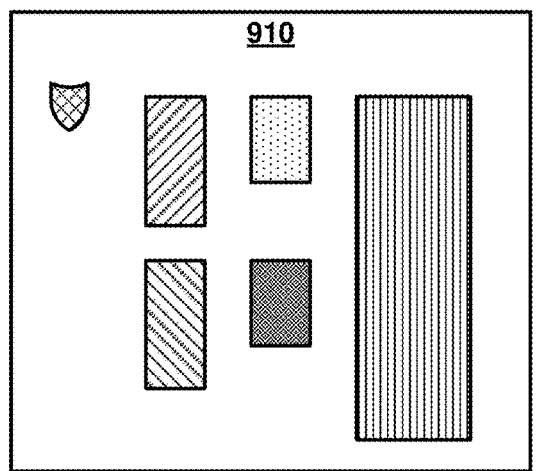
FIG. 10 is an example FPGA layout implementing the example scheduler bank of FIG. 9.
Figure 10:
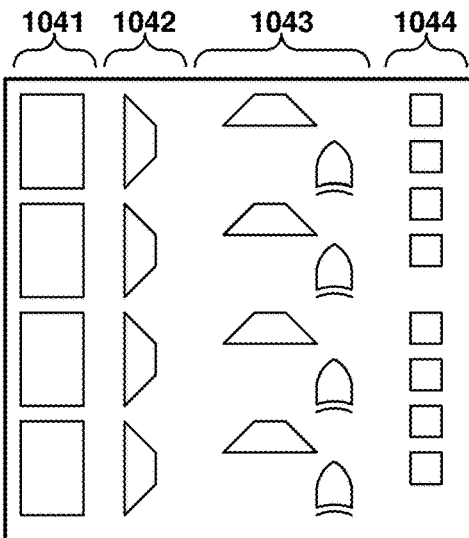
Figure 10:
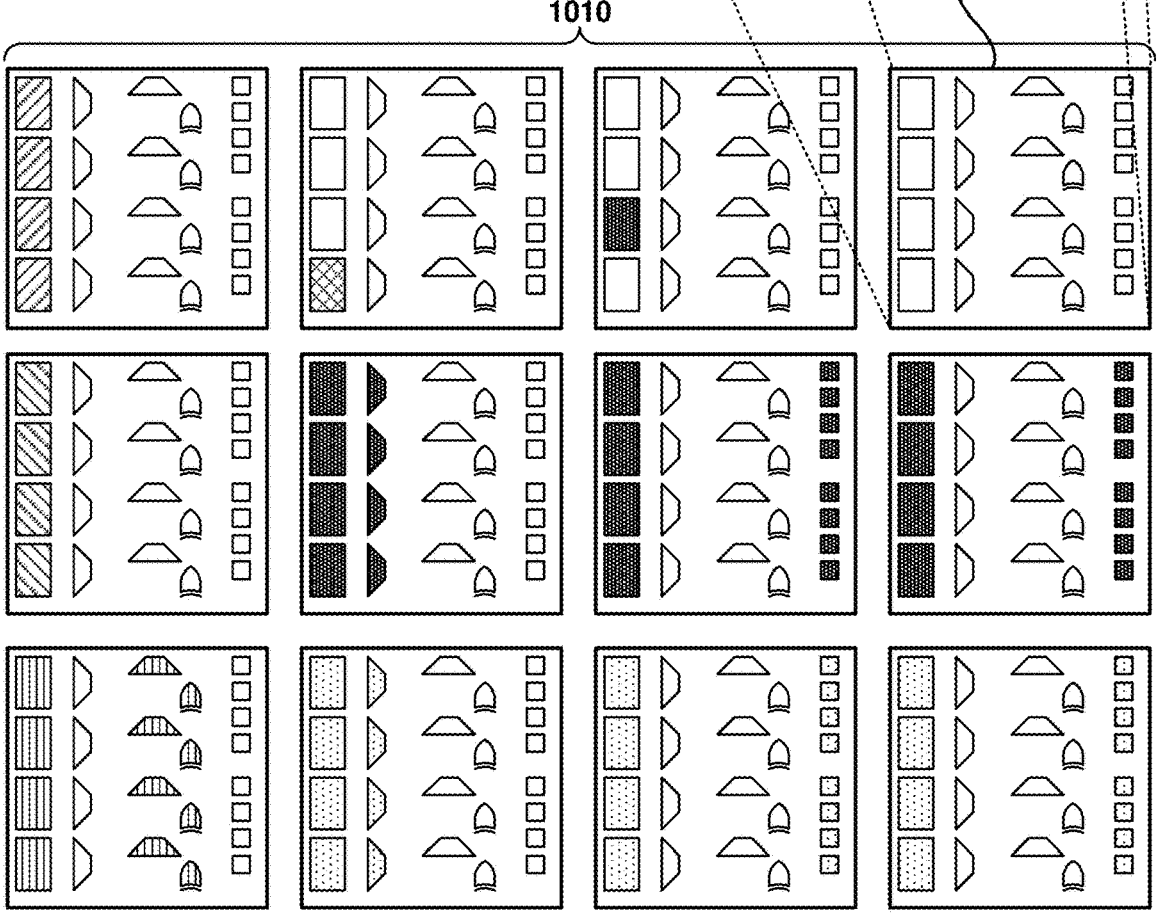

FIG. 10 is a diagram 1000 depicting an example of the scheduler bank 910 discussed above after it has been mapped to programmable components in an FPGA reconfigurable logic device. For example, an FPGA similar to that described above in FIGS. 3 and 4 can be used.

As shown, a 4×3 array of configurable logic blocks 1010 has been configured to implement the scheduler bank 910. The magnified inset view 1020 shows some of the logic components that are available within a single example logic block 1030. As shown, the example logic block 1030 includes a column of four LUT RAMs 1041, a column of multiplexers 1042 that can select the outputs of the LUT RAMs or an input to the logic block, a set of arithmetic and carry logic 1043, and a set of sequential storage elements 1044, which can be implemented using, for example, latches or flip-flops. Each of the logic blocks 1010 can have an identical or a similar composition, depending on the particular FPGA design. The shaded diagram 1050 has different shadings for the associated components within the logic blocks 1010 illustrated in FIG. 9. The respective logic components are shaded to match the shading in the shaded diagram 1050. Thus, the disclosed scheduler banks can be implemented using a relatively small amount of logic resources of a reconfigurable logic device.

XI. Example Incremental Instruction Scheduler Core

Figure 11:
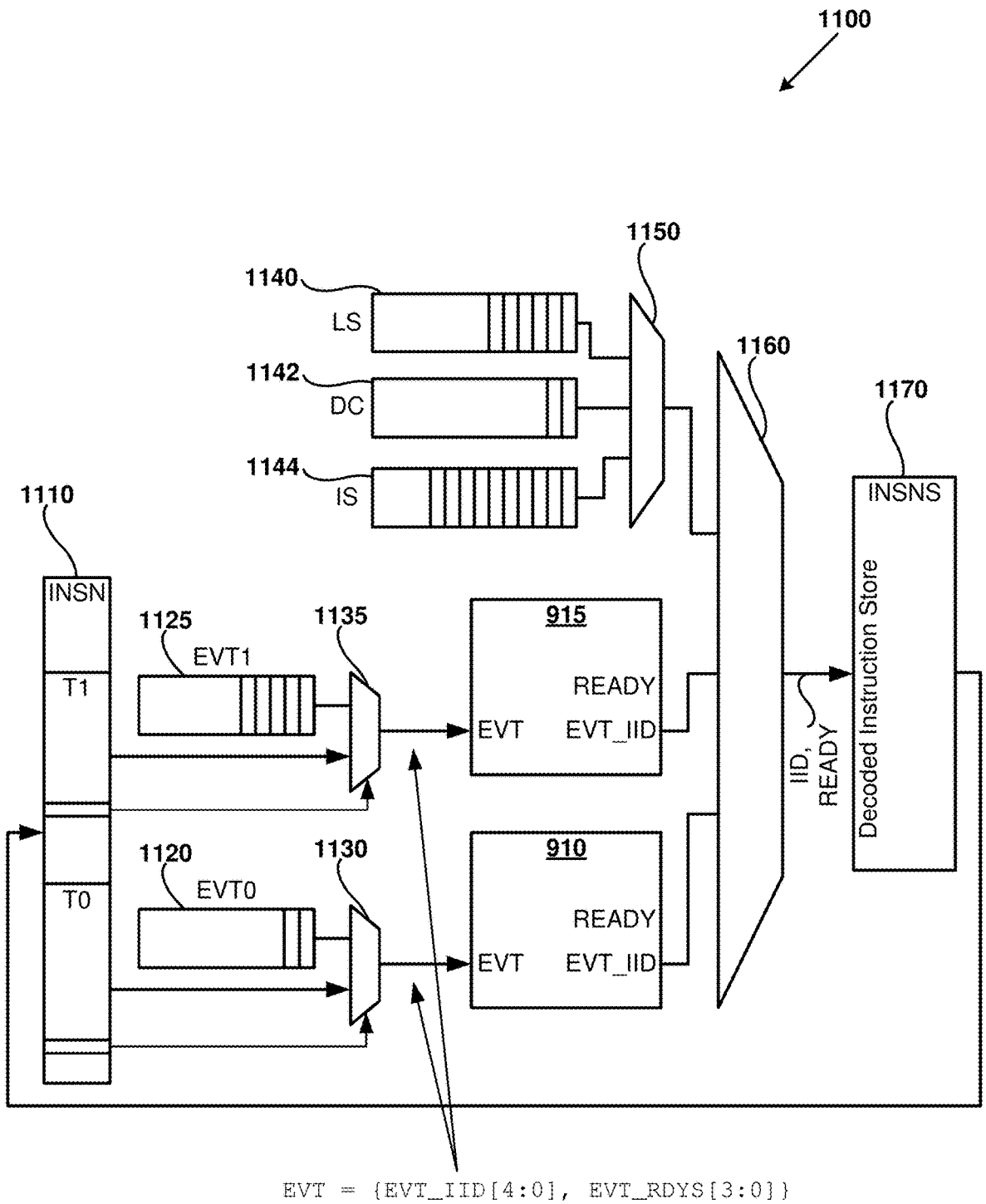
FIG. 11 is a block diagram outlining an example instruction scheduler core including a plurality of scheduler state cores, as can be used in certain examples of the disclosed technology.

FIG. 11 is a block diagram 1100 illustrating an example core of an instruction scheduler, as can be used in certain examples of the disclosed technology. For example, the scheduler core can be used as part of the instruction scheduler 235 discussed above regarding FIG. 2. In some examples, the instruction scheduler is implemented as a custom or ASIC circuit which in other examples, the components can be mapped to their reconfigurable logic device, such as an FPGA.

The illustrated scheduler core includes a register (i.e. array of flip-flops) 1110 (INSN) storing a decoded instruction with two target event fields. The instruction decoder fetches an instruction block header and fetches and decodes instructions and stores the data in the decoded instruction store 1170. Data is stored for each possible target instruction T0 and T1 of instructions according to the example edge ISA. The scheduler core further includes a set of target ready event queues 1120 and 1125 that store events received from executing other instructions. A pair of multiplexers 1130 and 1135 is used to either select ready state data from its respective event queue, or select ready state data from the decoded instruction store 1170, depending on which component the instruction scheduler selects to prioritize. The outputs of each of the multiplexers 1130 and 1135 are, in turn, sent to one of the instruction scheduler banks 910 and 915 as shown.

It should be noted that the decoded instruction store 1170 stores an array of decoded instructions whereas the register 1110 is a register that (for one cycle) holds the currently issuing decoded instruction. A decoded instruction to issue is read from the decoded instruction store 1170 and is latched in the register 1110, so that in the next cycle its target fields T0 and T1 are used to update and check the readiness state of the instruction(s) it targets. There is a recurrence so that as a given instruction #1 issues, the scheduler updates and checks the readiness of the instruction(s) it targets. This can cause the READY/EVT_IID fields of blocks 910 and/or 915 to be asserted, e.g., discovering zero, one, or two target instructions that become ready this cycle.

It should further be noted that the EVT signals that are inputs to the instruction scheduler banks 910 and 915 in FIG. 9 include two short bit vectors dubbed EVT_IID and EVT_RDYS. This can be expressed in the C++ language as shown in Table 2:

TABLE 2

```
struct EVT {
  int EVT_IID : 4; // or 5
  int EVT_RDYS : 4;
};
```

Each of the scheduler banks 910 and 915 can have a similar composition as the scheduler bank discussed above regarding FIG. 9. An additional number of instruction issue queues are included, including a load/store IID queue 1140, a decoder ready IID queue 1142, and an issue ready IID queue 1144. Each of the queues 1140, 1142, and 1144 store instruction identifiers for instructions that have been found to be ready to issue but have not yet issued. A ready instruction selector 1150 is used to select one of the illustrated IID queues 1140, 1142, or 1144. An additional selector 1160 is used to select data from one or more of the scheduler banks 910 and/or from the ready instruction selector 1150. The selector 1160 outputs an instruction ID and an associated bit indicating that whether the instruction is ready to a decoded instruction store 1170. When an instruction is indicated as being ready, then execution of the instruction or instructions can begin, for example, by selecting operands from an operand buffer and/or configuring execution units within the execution pipeline to perform the operation specified by the associated instruction. In some examples, the selectors 1150 and 1160 are not actually strictly multiplexers, but can be used to select plural sets of data concurrently. For example, if a block-based processor supports issuing two instructions concurrently, then the selector 1160 can selected instruction ID data for two instructions at a time to the decoded instruction store 1170. The decoded instruction store is a RAM storing decoded instruction data that, in turn, is used to generate control signals for controlling the scheduler and the execution and pipeline of the block-based processor.

It should be noted that the queues EVT0 1120 and EVT1 1125 are event queues that hold pending target ready events (e.g., 8 or 9 bits wide) that arrived previously and await delivery and update of the corresponding scheduler bank. The queues are used if there are bank conflicts (where two target ready events want to be delivered to the same scheduler bank in a given cycle) or where multiple events arise from different parts of the core (e.g., issue events, multi-cycle latency function unit target ready events, predicate target ready events, and load-response target ready events). Even in a one-issue core there can be a surge of four or more events to deliver to a given scheduler bank and the event queues buffer this surge of events so that no events are lost.

The queues 1140, 1142, and 1144 are issue queues. These queues hold pending instruction issues, for example, by holding the instruction ID (IID) of instructions that have been determined to be ready to issue, but that have not yet been issued. These issue queues get used when there is a surge of instructions discovered to be ready to issue but the back end of the processor can only accept a smaller number of instructions (e.g., one or two instructions) per cycle.

For example, when the scheduler banks 910 and 915 both discover their target is ready to issue, one of the instruction IDs is selected to issue (the output of 1160) and the other is held in the queue 1144 for issue later when there is no higher priority instruction ready to issue (as selected by selector 1160).

It should be further noted that the selectors 1150 and 1160 are arbiter-multiplexers called 3-to-1 selectors which accept both values (e.g., IIDs) and corresponding "valid inputs," where at most one of the valid inputs is selected per cycle.

In some examples, "even" instructions are stored and processed by the first scheduler bank 915, and "odd" instructions are stored and processed using the second scheduler bank 915. For example, a most significant bit or a least significant bit of the instruction identifier determines whether the instruction scheduler data is processed by the first or second scheduler bank. By partitioning scheduler instruction readiness data across multiple banks, multiple target ready events may be processed in a single clock cycle.

In some examples, one or more of the RAMs used to implement the instruction scheduler is a static RAM, and the RAM is accessed by applying an address to an input of the RAM based on an associated instruction identifier. In some examples, the instruction identifier is encoded within a respective instruction. An instruction targets one or more instructions by having an encoding of that instruction identifier and the source instruction targeted by the instruction is determined based on the instruction's relative position in the instruction block. In some examples, the scheduler state data includes data indicating dependencies of the instructions and data indicating whether dependencies of the instructions have been satisfied for a currently executing instance of the instruction block. In some examples, the instruction scheduler refreshes scheduler state for an instance of the instruction block by resetting some, but not all, of the storage scheduler state for a previously executed instance of the instruction block.

In some examples, each entry of the ready state RAMs 920 and 930 includes a sequence number field indicating which instance of an instruction block is associated with the entry. Thus, upon re-executing an instruction block in a processor core, upon reading a ready state RAM 920 or 930 entry, its sequence number field is compared to the sequence number for the instruction block, and if it matches, the entry's ready state was already written during this instruction block instance, and is valid, and may be used to determine instruction readiness, whereas if it differs, i.e. the entry's ready state corresponds to the state written during the execution of some other instruction block, it is considered invalid and is interpreted as being reset (treated as all 0s). Thus to (logically) flash clear the scheduler ready state in LUT RAM, as required on block reset, it suffices to increment the block sequence number so that any prior ready state (tagged with the old block sequence number) is considered invalid. When the ready state RAM entry sequence number matches the instruction block's sequence number, Time and energy can be saved by avoiding regeneration of at least a portion of the scheduler state data in decoding. The first time a block is decoded, the decoder writes the instruction IDs of all trivially issuable instructions (instructions with 0 input dependencies) into the IS ready queue 1144. Upon block refresh, the block is not decoded, so the IS ready queue 1144 is rewound and replayed to issue the series of instruction IDs that are trivially issuable. Thus, ready state data can be preserved across block reset/refresh, but without re-computing the ready state data for each instruction, as might be done in certain examples of parallel instruction schedulers.

In some examples, all or some of the queues 1120, 1125, 1140, 1142, and/or 1144 are implemented using a LUT RAM of an FPGA that has been configured to operate as a shift register, a variable length shift register, or a first in/first out buffer. Some FPGA vendors provide logic devices, compiler directives, and/or instantiated objects that can be used to implement such shift registers and FIFOs efficiently using LUT RAM. In some examples, each of the queues is formed by configuring LUT RAMs to store ready state data for a plurality of instructions in an instruction block on a first in/first out basis.

In some examples of the disclosed technology, a block-based processor supports instructions including a broadcast identifier. The broadcast identifier specifies one of a limited number of channels. Any number of instructions can receive data on the broadcast channel. Thus, an instruction result can be sent to more instructions than can be specified by the one or two instruction target fields in the instruction. Upon generation of a broadcast event, every entry in the scheduler's active ready state LUT-RAMs will be updated to reflect the broadcast event. In some examples, broadcast scheduler updates can be performed by brute force by iterating over every instruction ID that was decoded in this block (e.g., iterating up to the block max size). In some examples, broadcast scheduler updates can be performed faster by tracking (using, e.g., a bit mask) which instructions consume broadcast inputs, and then selectively delivering the broadcasted ready state to each entry in that set. In some examples, broadcast scheduler updates faster by tracking (in several sets) which instructions consume which specific broadcast inputs, so that, for example on broadcast channel 1 the scheduler delivers events only to those instructions that receive an operand on broadcast channel 1, etc. In some examples, a broadcast event may be generated before all instructions in an instruction block have been decoded. In such cases, all broadcast events can be re-broadcast once all the instructions in the block have been decoded. Alternatively, broadcast events can be delivered selectively to those instructions found to take input on a given broadcast channel, as the later-decoded instructions are decoded.

Figure 12:
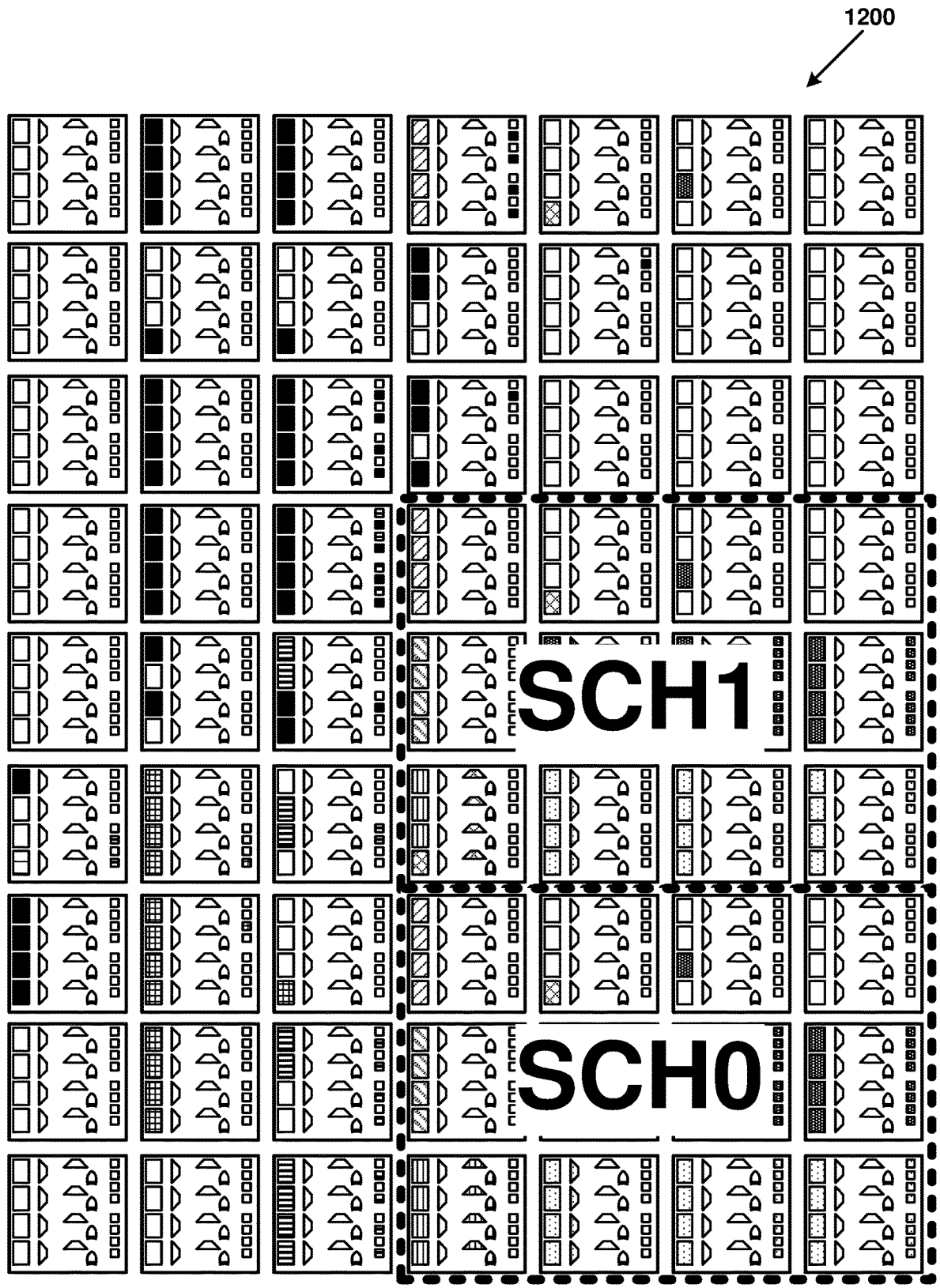
FIG. 12 is an example FPGA layout that includes the core scheduler depicted in FIG. 11, as can be used in certain examples of the disclosed technology.

FIG. 12 is a layout diagram 1200 of the example core scheduler design discussed above regarding FIG. 11 showing an example mapping to logic blocks in an FPGA, as can be used in certain examples of the disclosed technology. As shown, each of the scheduler banks is indicated as shown (SCH0 and SCH1). Other components of the scheduler core have been mapped according to the indicated shading. Thus, the scheduler core can be implemented using a relatively small number of logic blocks in an FPGA.

XII. Example Block-Based Processor and Memory Configuration

Figure 13:
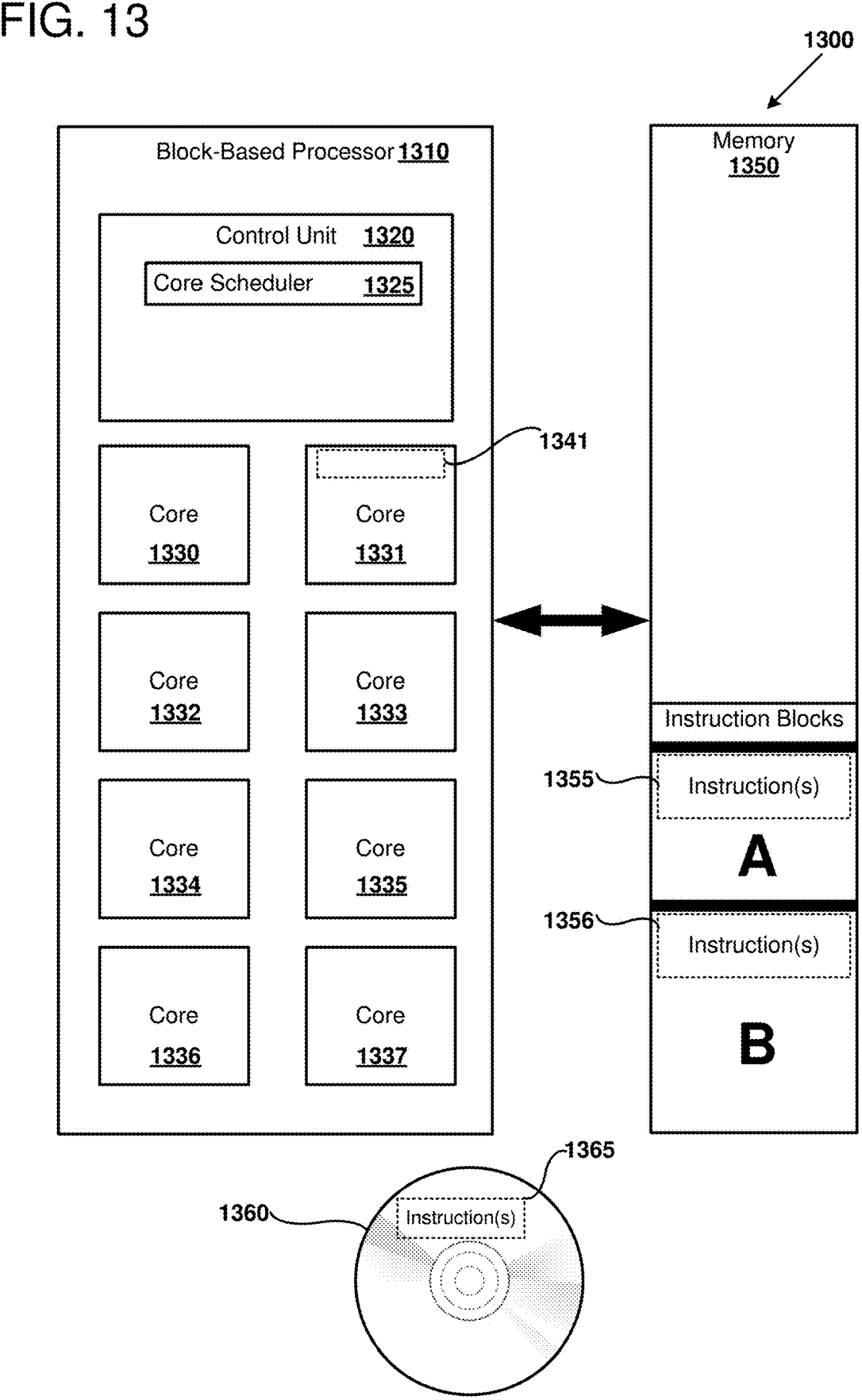
FIG. 13 is a block diagram illustrating an example configuration including a block-based processor and memory, as can be used in certain examples of the disclosed technology.

FIG. 13 is a diagram 1300 illustrating an apparatus comprising a block-based processor 1310, including a control unit 1320 configured to execute instruction blocks including instructions for memory operations including memory synchronization and memory locks. In some examples, the block-based processor is implemented in a custom integrated circuit or ASIC, which in other examples, the block-based processor is implemented using configurable logic, such as in an FPGA. The control unit includes a core scheduler 1325 that controls allocation and de-allocation of cores for performing instruction processing, control of input data and output data between any of the cores, register files, memory interfaces and/or I/O interfaces. The control unit 1320 can also include dedicated registers for performing certain memory operations.

The block-based processor 1310 also includes one or more processor cores 1330-937 that are configured to fetch and execute instruction blocks. Each of the cores includes an instruction scheduler (e.g., instruction scheduler 1341) that controls the clock cycle and the order in which instructions in an instruction block are fetched, decoded, issued, and executed. The illustrated block-based processor 1310 has up to eight cores, but in other examples there could be 1, 2, 4, 64, 512, 1024, or other numbers of block-based processor cores. The block-based processor 1310 is coupled to a memory 1350 which includes a number of instruction blocks, including instruction blocks A and B, which include instructions (1355 and 1356, respectively) implementing disclosed memory operations, and to a computer-readable storage media disc 1360 that stores instructions 1365 for performing disclosed memory operations.

XIII. Example Method of Operating a Block-Based Processor

Figure 14:
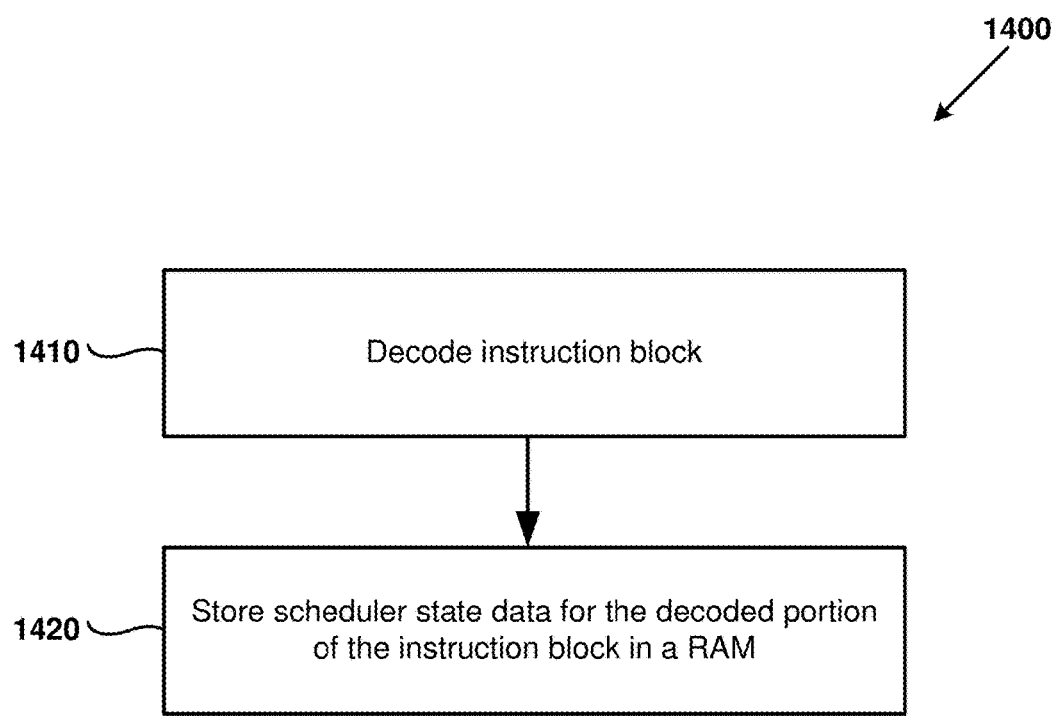
FIG. 14 is a flowchart outlining an example method of storing scheduler state data, as can be performed in certain examples of the disclosed technology.

FIG. 14 is a flowchart 1400 outlining an example method of using an instruction scheduler, as can be performed in certain examples of the disclosed technology. For example, the block-based processors discussed above regarding FIGS. 1 and 2, including implementations having schedulers similar to those described above regarding FIGS. 9-13 can be used to implement the method illustrated in FIG. 14, as well as methods in the following flowcharts of FIGS. 15-17.

At process block 1410, an instruction block is fetched from memory and decoded using an instruction decoder. This generates a number of control bits that can be stored in a RAM for controlling operation of the processor when the instruction is issued and executed. For example, the decoded instruction data can be stored in one or more RAMs implementing the block-based processor. After at least a portion of the instruction block has been decoded, the method proceeds to process block 1420.

At process block 1420, scheduler state data for the decoded portion of the instruction block is stored in a RAM. In some examples, the RAM is an FPGA LUT RAM or distributed RAM. In some examples, the RAM is an SRAM in an ASIC or other type of integrated circuit. Storing the scheduler state in the RAM can improve area consumed by the scheduler, as RAMs can be often be fabricated using less chip area than flip-flop arrays. In some examples, reset logic is added to RAM structures that do not provide built-in support for set/reset by adding additional logic to compare a valid bit, stored in, for example, one flip-flop for each address of the RAM, and outputting a reset value if the valid bit is not set, or outputting the value stored in RAM if the valid bit is set.

The storage scheduler state data can be used to operate an instruction scheduler in order to select instructions that are ready to issue so they can be executed.

XIV. Example Method of Evaluating Stored Scheduler State Data

Figure 15:
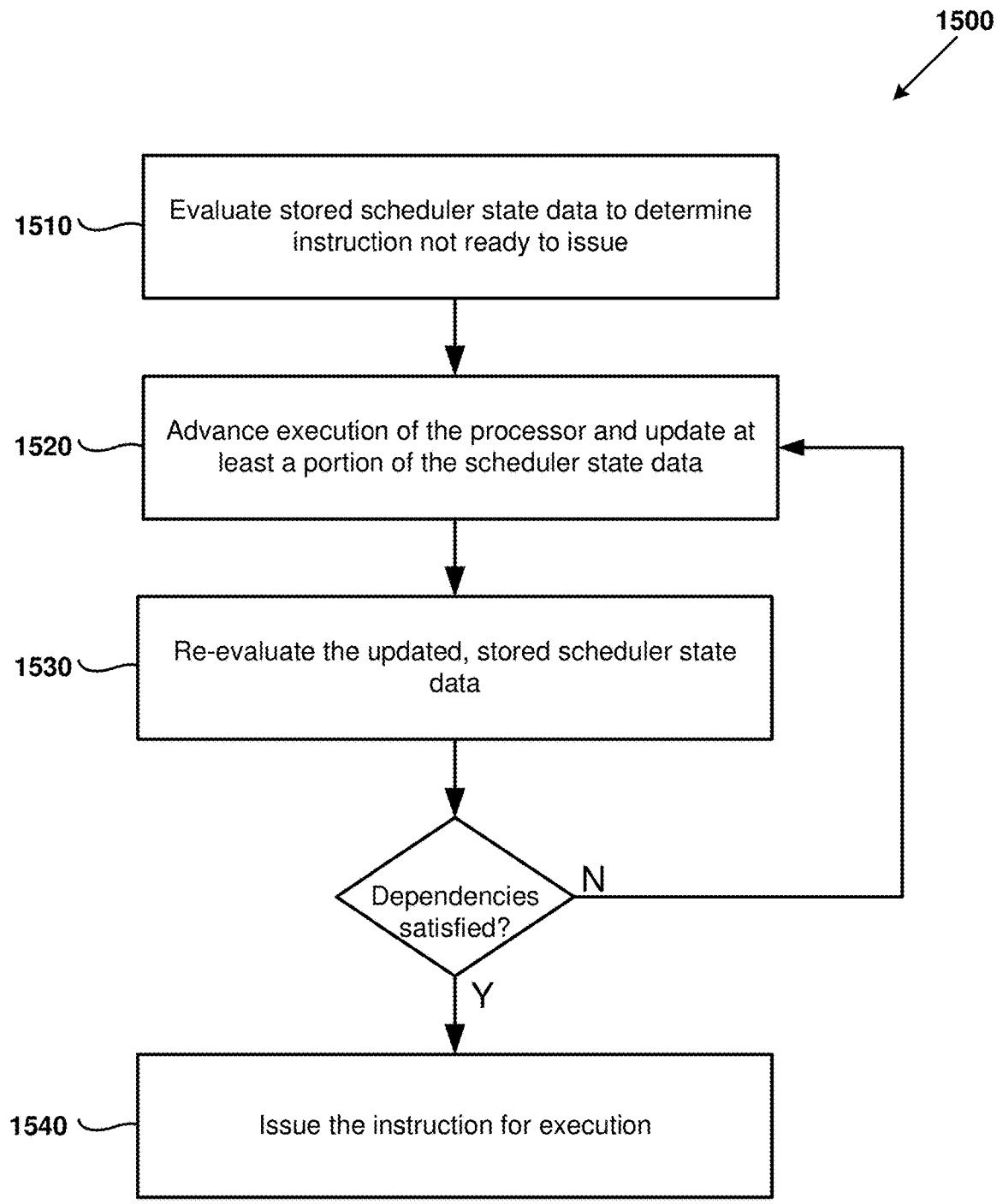
FIG. 15 is a flowchart outlining an example method of re-evaluating storage scheduler state data, as can be performed in certain examples of the disclosed technology.

FIG. 15 is a flowchart 1500 outlining an example method of evaluating stored scheduler state data, as can be performed in certain examples of the disclosed technology.

At process block 1510, stored scheduler state data is evaluated and it is determined that the evaluated instruction is not ready to issue. For example, if one of the instructions dependencies, such as one of its input operands, its predicate, or a value from a register read or memory load queue is not available, then the corresponding ready state data will indicate that the corresponding instruction is not ready to issue.

At process block 1520, execution of the processor advances, for example by executing a different instruction than the instruction that was evaluated at process block 1510. At least a portion of the scheduler state data is updated by advancing execution of the processor. For example, the executing instruction may generate one or more target operands, predicate values, or cause a register read or memory load to occur. The scheduler state data can be updated using, for example, ready logic 940 within a scheduler bank 910, as discussed above. Once execution of the processor has advanced, the method proceeds to process block 1530.

At process block 1530, the updated stored scheduler state data is reevaluated. If dependencies of a respective instruction are not satisfied, then the method proceeds to process block 1520 based on execution of the processor advancing, for example by execution of a different instruction than the evaluated instruction. On the other hand, if the dependencies for the instruction are satisfied, then the respective instruction is indicated to be ready for issue, and at some point the instruction will be issued at process block 1540. Depending on the configuration of the scheduler, the instruction may immediately issue, or be queued behind other instructions that were determined to be ready to issue beforehand. In some examples, a priority encoder plus multiplexer can be used to select next instructions to issue.

XV. Example Method of Scheduler State Data Including Sequence Numbers

Figure 16:
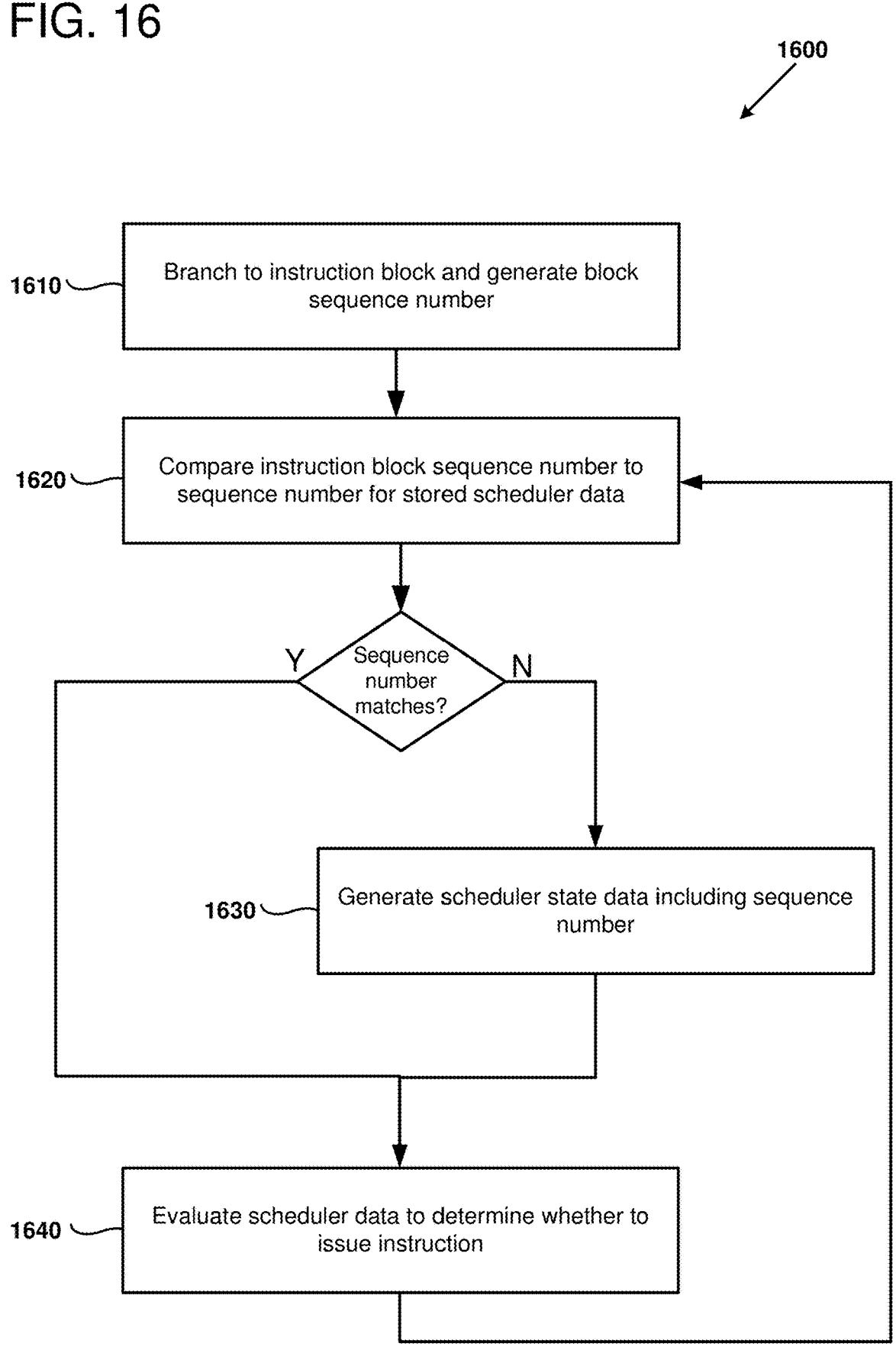
FIG. 16 is a flowchart outlining an example method of generating and evaluating scheduler state data including sequence numbers, as can be used in certain examples of the disclosed technology

FIG. 16 is a flowchart 1600 outlining an example method of generating scheduler state data including the use of sequence numbers, as can be performed in certain examples of the disclosed technology.

At process block 1610, processor execution causes the state of the processor to branch to an instruction block. This can be performed by updating an instruction address register that stores the location of the currently executing instruction block. Branches can be encoded explicitly or implicitly and called by other instruction blocks. The branch further causes a block sequence number to be updated to a new value. For example, the block sequence number can be incremented or decremented from a previously-stored value.

At process block 1620, the block sequence number generated at process block 1610 is compared to a sequence number stored with the scheduler data. For example, upon writing stored scheduler data to a RAM, the current block sequence number is stored at the same address as the data (e.g., consuming the 6 most significant bits of a word of the RAM). The stored scheduler data is read from the RAM, it is compared to the current block sequence number. If the sequence number does not match, then the entry is deemed invalid, the method proceeds to process block 1630, and new scheduler state data is generated and stored, including the current block sequence number. Scheduler state data can be stored and instruction scheduler using techniques such as those described above. On the other hand, if the sequence number matches the stored scheduler data, the method proceeds directly to process block 1640, as the scheduler state data is determined to be valid based on the matching sequence number.

At process block 1640, the scheduler data is evaluated to determine whether to issue the instruction. For example, once all of the instruction dependencies have been satisfied, instruction is ready to issue and can then be selected to issue by the instruction scheduler. This method continues for a number of instructions of the instruction block by proceeding to process block 1620 to compare the sequence number stored in RAM for other instructions. Once a new instruction block is branched to, the method proceeds to process block 1610.

Figure 17:
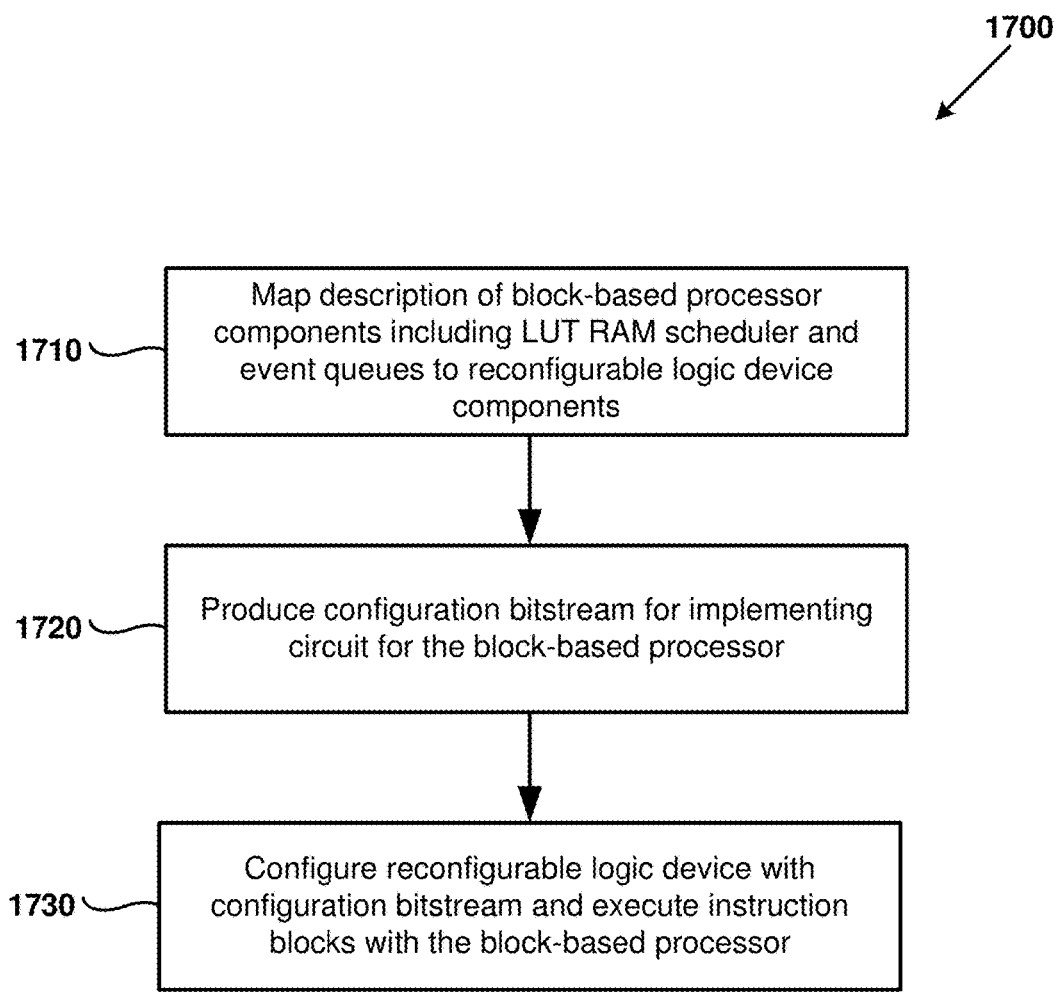
FIG. 17 is a flow chart outlining an example method of producing a configuration bit-stream for implementing a block-based processor, as can be performed in certain examples of the disclosed technology.

XVI. Example Method of Configuring Logic Devices with an Incremental Scheduler FIG. 17 is a flow chart 1700 outlining an example method of configuring a reconfigurable logic device, as can be performed in certain examples of the disclosed technology. For example, the FPGA discussed above regarding FIG. 3 can be configured to implement the block-based processor of FIG. 1 using the example microarchitectures discussed above, including the schedulers disclosed above.

At process block 1710, a description of block-based processor components is mapped to reconfigure logic device components of the FPGA. For example, a process designer can specify a description of the block-based processor in the hardware description language, such as SystemVerilog, SystemC, Verilog, or any other suitable combination of hardware description languages. In some examples, a description written in a traditional programming language such as C or C++ is used to describe at least a portion of the block-based processor. The description of the block-based processor can include any of the components discussed above. In some examples, the designer can specify specific FPGA cells to be targeted by elements of the processor microarchitecture. For example, the designer may specify that the instruction cache and/or the data cache are implemented using block RAM resources of the FPGA. In some examples, the programmer can use available macros provided by the FPGA vendor to implement LUT RAM based schedulers and event queues disclosed herein.

At process block 1720, a configuration bitstream is produced for implementing an incremental scheduler circuit for the block-based processor. For example, a description of a block-based processor expressed in a hardware description language can be compiled to generate a netlist, and the netlist in turn used to generate a bitstream file. The signals indicated in the bitstream file can be applied to the configuration interface of an FPGA in order to configure the FPGA to perform functions for implementing a block-based processor according to the disclosed techniques.

At process block 1730, the reconfigurable logic device is configured using the bitstream generated at process block 1720. For example, some FPGAs have a readback port that is used to serially stream data into configuration memory of the FPGA, thereby configuring the FPGA. In some examples, configuration memory of the FPGA is addressed through a parallel or other addressable port. In some examples, a configurable logic device having a structure similar to an FPGA can be configured once, but not reconfigured. In other examples, the FPGA can be electrically erased and rewritten to in order to provide a new configuration. In some examples, the FPGA is re-configured whenever the integrated circuit is re-powered, while in other examples, the FGPA configuration maintains state across repeated power cycles.

XVII. Example Computing Environment

Figure 18:
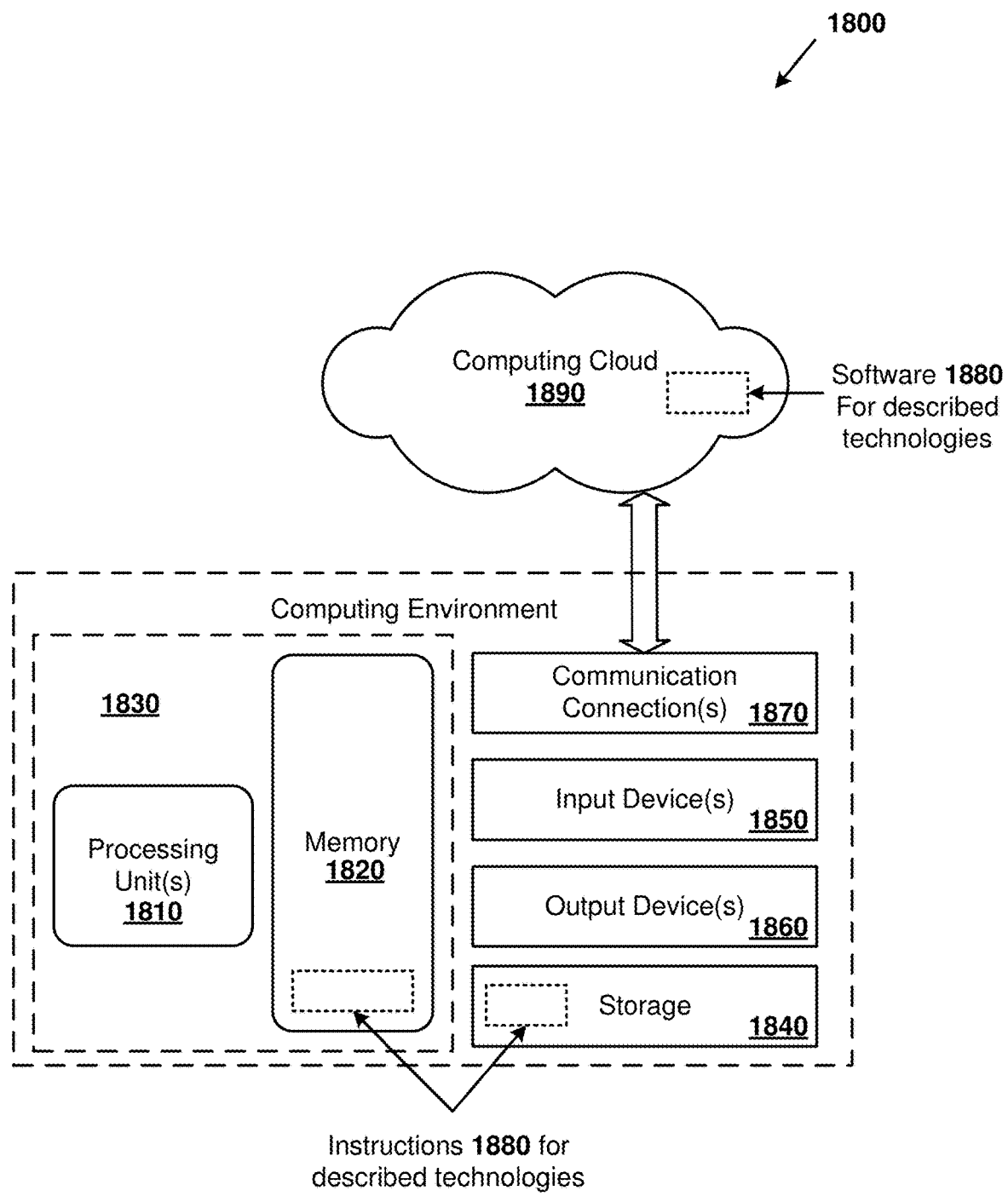
FIG. 18 is a block diagram illustrating a suitable computing environment for implementing certain embodiments of the disclosed technology.

FIG. 18 illustrates a generalized example of a suitable computing environment 1800 in which described embodiments, techniques, and technologies, including configuring a block-based processor, can be implemented. For example, the computing environment 1800 can implement disclosed techniques for configuring a processor to implement disclosed block-based processor architectures and microarchitectures, and/or compile code into computer-executable instructions and/or configuration bitstreams for performing such operations, as described herein.

The computing environment 1800 is not intended to suggest any limitation as to scope of use or functionality of the technology, as the technology may be implemented in diverse general-purpose or special-purpose computing environments. For example, the disclosed technology may be implemented with other computer system configurations, including hand held devices, multi-processor systems, programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules (including executable instructions for block-based instruction blocks) may be located in both local and remote memory storage devices.

With reference to FIG. 18, the computing environment 1800 includes at least one block-based processing unit 1810 and memory 1820. In FIG. 18, this most basic configuration 1830 is included within a dashed line. The block-based processing unit 1810 executes computer-executable instructions and may be a real or a virtual processor. In a multi-processing system, multiple processing units execute computer-executable instructions to increase processing power and as such, multiple processors can be running simultaneously. The memory 1820 may be volatile memory (e.g., registers, cache, RAM), non-volatile memory (e.g., ROM, EEPROM, flash memory, etc.), or some combination of the two. The memory 1820 stores software 1880, images, and video that can, for example, implement the technologies described herein. A computing environment may have additional features. For example, the computing environment 1800 includes storage 1840, one or more input device(s) 1850, one or more output device(s) 1860, and one or more communication connection(s) 1870. An interconnection mechanism (not shown) such as a bus, a controller, or a network, interconnects the components of the computing environment 1800. Typically, operating system software (not shown) provides an operating environment for other software executing in the computing environment 1800, and coordinates activities of the components of the computing environment 1800.

The storage 1840 may be removable or non-removable, and includes magnetic disks, magnetic tapes or cassettes, CD-ROMs, CD-RWs, DVDs, or any other medium which can be used to store information and that can be accessed within the computing environment 1800. The storage 1840 stores instructions for the software 1880, plugin data, and messages, which can be used to implement technologies described herein.

The input device(s) 1850 may be a touch input device, such as a keyboard, keypad, mouse, touch screen display, pen, or trackball, a voice input device, a scanning device, or another device, that provides input to the computing environment 1800. For audio, the input device(s) 1850 may be a sound card or similar device that accepts audio input in analog or digital form, or a CD-ROM reader that provides audio samples to the computing environment 1800. The output device(s) 1860 may be a display, printer, speaker, CD-writer, or another device that provides output from the computing environment 1800.

The communication connection(s) 1870 enable communication over a communication medium (e.g., a connecting network) to another computing entity. The communication medium conveys information such as computer-executable instructions, compressed graphics information, video, or other data in a modulated data signal. The communication connection(s) 1870 are not limited to wired connections (e.g., megabit or gigabit Ethernet, Infiniband, Fibre Channel over electrical or fiber optic connections) but also include wireless technologies (e.g., RF connections via Bluetooth, WiFi (IEEE 802.11a/b/n), WiMax, cellular, satellite, laser, infrared) and other suitable communication connections for providing a network connection for the disclosed methods. In a virtual host environment, the communication(s) connections can be a virtualized network connection provided by the virtual host.

Some embodiments of the disclosed methods can be performed using computer-executable instructions implementing all or a portion of the disclosed technology in a computing cloud 1890. For example, disclosed compilers and/or block-based-processor servers are located in the computing environment, or the disclosed compilers can be executed on servers located in the computing cloud 1890. In some examples, the disclosed compilers execute on traditional central processing units (e.g., RISC or CISC processors).

Computer-readable media are any available media that can be accessed within a computing environment 1800. By way of example, and not limitation, with the computing environment 1800, computer-readable media include memory 1820 and/or storage 1840. As should be readily understood, the term computer-readable storage media includes the media for data storage such as memory 1820 and storage 1840, and not transmission media such as modulated data signals.

XVIII. Additional Examples of the Disclosed Technology

Additional examples of the disclosed subject matter are discussed herein in accordance with the examples discussed above. For example, aspects of the block-based processors discussed above regarding FIGS. 1, 2, and 9-13 can be used to implement these additional examples, including FPGAs such as those discussed above regarding FIGS. 3 and 4.

In certain examples of the disclosed technology, all or a portion of a block-based processor are implemented by configuring an FPGA to include structures for executing programs expressed in the block-based processor ISA. In some examples, the processor is implemented in an embedded device such as for deploying in a network of Internet of Things (IoT). In some examples, structures such as caches, and storage used in the instruction scheduler, the load store queue and/or the register file are implemented in memories having a single write port or a single read port. In other examples, one or more of these structures are implemented in memories having multiple read and/or write ports. In some examples, an instruction block header, and one or more instructions of the instruction block can be fetched from memory and/or the instruction cache, concurrently. In some examples, a bypass mechanism allows for operations generated from the execution portion of the microarchitecture pipeline to bypass operands, thereby allowing for the back-to-back issue of instructions having a shared or chained dependencies. In some examples, the bypass mechanism allows for the avoidance of pipeline stall when there are more operands generated during an execution clock cycle than write ports on the instruction window operand buffer.

In some examples, the scheduler can use decoded or previously decoded instruction dependencies to wake up and issue instructions before they have been fetched. In some examples, storage for the instruction scheduler can be split in to two or more portions in order to map the storage to two or more physical storage units of an FPGA. In some examples, the instruction scheduler includes a parallel scheduler. In other examples, the instruction scheduler includes one or more event queues and one or more instruction queues. In some examples, the scheduler is configured to refresh some but not all of an instructions ready state upon re-executing an instruction block. In other examples, multiple blocks' ready state can be maintained in a single incremental scheduler. In other examples, a first block's ready state can be maintained in an incremental scheduler and concurrently a second block's instructions (and therefore its per-instruction ready state) can be fetched, decoded, and used to initialize the second block's ready state in the same incremental scheduler. In other examples, a decoded instruction ready queue can implement block refresh by rewinding the queue to replay the series of decoded instructions in the queue.

In some examples of the disclosed technology, a block-based processor includes an instruction scheduler configured to store scheduler state for a block of instructions in a random-access memory (RAM), the RAM being indexed based on an instruction identifier encoded in a respective one of the instructions. In some examples the RAM is a static RAM accessed by applying an address to an input of the RAM based on the instruction identifier. In some examples, the scheduler state includes data indicating dependencies of the instructions and data indicating whether dependencies of the instructions have been satisfied for a currently-executing instance of an instruction block. In some examples, the instruction scheduler refreshes scheduler state for an instance of an instruction block by resetting some, but not all, of the stored scheduler state for a previously-executed instance of the instruction block. In some examples, the scheduler state comprises a sequence number indicating which instance of the instruction block is associated with the scheduler state data stored in the RAM. The sequence number can be used to indicated whether scheduler state data entries stored in the RAM are valid (because they were generated by the currently-executing instruction block) or invalid (because they are leftover data from a previous instruction block that wrote data to the scheduler RAM.

In some examples, the block-based processor includes a number of execution units, each of the execution units being configured to perform an operation for a single instruction in one clock cycle of the block-based processor, and the instruction scheduler further includes one or more queues storing data indicating that a number of instructions are ready to issue, and the number of instructions being ready to issue exceeds the number of execution slots by at least one instruction. In some examples, at least one of the queues is implemented using a lookup table memory (LUT) of a field-programmable gate array (FPGA) configured to operate as a variable-length shift register or first-in first out buffer.

In some examples of the disclosed technology, one-time configurable or reconfigurable logic devices, are configure to include an instruction scheduler formed by configuring one or more lookup table (LUT) RAMs in the reconfigurable logic device to store ready state data for a plurality of instructions in an instruction block. In some examples, the logic devices are programmed by electrically programming configuration RAM in a device by applying configuration data to a configuration port of an integrated circuit. In some examples, the logic devices are programmed by destructive techniques (e.g., a laser or electron beam gun) or using a programmed photolithography mask to program connections in an integrated circuit. In some examples, the processor includes a plurality of event queues, each of the event queues being configured to temporarily store and to send dependency information for instructions on a first-in, first-out basis. In some examples, each of the instructions in the block of instructions is associated with a respective instruction identifier; and the instruction scheduler further comprises two scheduler banks, a first one of the scheduler banks storing instruction ready state data for instructions having zero value for a particular bit of the respective instruction's instruction identifier, and a second one of the scheduler banks storing instruction ready state data for instructions having one value for a particular bit of the respective instruction's instruction identifier. In some examples, a method of programming the (re)configurable logic devices includes producing a configuration bitstream comprising configuration information that implements a circuit for the reconfigurable logic devices that will implement the circuit when applied to a configuration port of the reconfigurable logic devices.

In some examples of the disclosed technology, a method of operating a block-based processor, includes decoding at least a portion of an instruction block with the processor and storing scheduler state data for the decoded instruction block portion in a random-access memory (RAM) of the processor.

In some examples, the method further includes evaluating the stored scheduler state data to determine that an instruction in the instruction block is not ready to issue, advancing execution of the block-based processor and updating at least a portion of the stored scheduler state data, after the advancing execution, re-evaluating the updated, stored scheduler state data, and based on the re-evaluating, issuing the instruction for execution by the block-based processor. In some examples, the method further includes resetting the scheduler state data for one or more instructions of the instruction block by resetting a valid bit for a respective each one of the instructions, wherein respective scheduler state data for the respective each one of the instructions is not cleared in the RAM itself.

In some examples, the method further includes receiving instruction event data generated by decoded and/or executing one or more instructions of the instruction block with the block-based processor, storing the instruction event data for at least one of the instructions in a queue, and, in a subsequent clock cycle, issuing the at least one instructions having instruction event data stored in the queue. In some examples, the storing occurs when there are more target ready events generated than can be scheduled by the block-based processor in a given clock cycle. In some examples, the storing occurs when there are more instructions ready to issue than can be issued by the block-based processor in a given clock cycle.

In some examples, the scheduler state data includes decoded ready state data, active ready state data, and event data. In some examples the method further includes: logically OR-ing a portion of the ready state data, the active ready state data, and the event data corresponding to an instruction of the instruction block to produce an ORed portion, and bitwise AND-ing the ORed portion to determine whether the instruction is ready to issue.

In some examples, the stored scheduler state data includes a first sequence number identifying the instruction block, and the method further includes: comparing a second sequence number stored with scheduler state data in a RAM to the first sequence number, and if the comparing indicates that the second sequence number is different than the first sequence number, then generating scheduler state data for the instruction and storing the scheduler state data for the instruction in the RAM, and if the comparing indicates that the second sequence number is the same as the first sequence number, then using the scheduler state data stored in the RAM to schedule the instruction.

In some examples, the stored scheduler state data includes a first sequence number identifying the instruction block, and the method further includes: comparing a second sequence number stored with scheduler state data in a RAM to the first sequence number, where the comparing indicates whether the stored scheduler state data is valid or invalid.

In some examples, broadcast scheduler updates can be performed by brute force, by tracking (using, e.g., a bit mask) which instructions consume broadcast inputs, and then selectively delivering the broadcasted ready state to each entry in that set, or by tracking (in several sets) which instructions consume which specific broadcast inputs. In some examples, a broadcast event may be generated before all instructions in an instruction block have been decoded and all broadcast events can be re-broadcast once all the instructions in the block have been decoded. Alternatively, broadcast events can be delivered selectively to those instructions found to take accept input on a given broadcast channel.

In view of the many possible embodiments to which the principles of the disclosed subject matter may be applied, it should be recognized that the illustrated embodiments are only preferred examples and should not be taken as limiting the scope of the claims to those preferred examples. Rather, the scope of the claimed subject matter is defined by the following claims. We therefore claim as our invention all that comes within the scope of these claims.

We claim:

1. An apparatus comprising reconfigurable logic devices, the reconfigurable logic devices comprising:
an instruction scheduler formed by configuring one or more lookup table (LUT) RAMs in the reconfigurable logic device to store ready state data for a plurality of instructions in an instruction block;
a plurality of event queues, each of the event queues being configured to temporarily store dependency data for instructions on a first-in, first-out basis; and
a selector configured to:
select one of the plurality of event queues,
receive dependency data from the selected one of the plurality of event queues, the received dependency data being sent from the event queue on the first-in, first-out basis, and
responsive to the received dependency data, send a signal indicating that an instruction of the plurality of instructions is ready to issue based on dependency data stored in the selected event queue for the instruction and to send a signal indicating an instruction identifier for the instruction that is ready to issue, wherein instructions from a given one of the plurality of event queues issue in the same order in which they are stored in that event queue.

2. The apparatus of claim 1, wherein:
each of the instructions in the block of instructions is associated with a respective instruction identifier; and
the instruction scheduler further comprises two scheduler banks, a first one of the scheduler banks storing instruction ready state data for instructions having zero value for a particular bit of the respective instruction's instruction identifier, and a second one of the scheduler banks storing instruction ready state data for instructions having one value for a particular bit of the respective instruction's instruction identifier.

3. The apparatus of claim 1, wherein the instruction scheduler comprises instruction scheduler means, the instruction scheduler means comprising two or more scheduler bank means formed from the LUT RAMs.

4. A method comprising:
producing a configuration bitstream comprising configuration information that implements a circuit for the reconfigurable logic devices of claim 1, when applied to a configuration port of the reconfigurable logic devices.

5. The apparatus of claim 1, wherein the LUT RAM is a static RAM, and wherein the LUT RAM is accessed by applying an address to an input of the static RAM based on the instruction identifier.

6. The apparatus of claim 1, wherein at least one of the event queues is implemented using LUT RAM of an FPGA that has been configured to operate as a shift register, a variable length shift register, or a first in/first out buffer.

7. The apparatus of claim 1, wherein the instruction identifier is not a register identifier.

8. The apparatus of claim 1, further comprising:
a priority encoder configured to select the selected one of the plurality of event queues by comparing priority of the instruction that is ready to issue to priority of a second instruction having dependency data stored in a different, second one of the plurality of event queues and determining the first instruction has a higher priority; and
based on the comparing, to send the signal indicating that the instruction that is ready to issue.

9. An apparatus comprising:
an instruction scheduler formed by configuring one or more lookup table (LUT) RAMs in a reconfigurable logic device to store ready state data for a group of two or more instructions;
a plurality of event queues, each of the event queues being configured to temporarily store and to send dependency data for a given at least two respective instructions of the group of instructions on a first-in, first-out basis; and a selector configured to:
select one of the plurality of event queues,
receive the dependency data for the selected event queue in the first-in, first-out basis,
send a signal causing the given at least two respective instructions associated with the received dependency data to issue according to the first-in, first-out basis, and
send a signal indicating an instruction identifier of the instruction associated with the received dependency data.

10. The apparatus of claim 9, wherein at least one of the event queues is coupled to the selector via a scheduler bank.

11. The apparatus of claim 9, wherein at least one of the event queues is coupled to the selector via a scheduler bank, the scheduler bank comprising a LUT RAM storing the dependency data for the respective at least one of the event queues, the dependency data including decoded ready state and active ready state.

12. The apparatus of claim 9, wherein at least one of the event queues is coupled to the selector via a scheduler bank, the scheduler bank receiving an instruction identifier output by the at least one of the event queues and generating a ready signal to indicate an instruction associated with the output instruction identifier is ready to issue.

13. The apparatus of claim 9, wherein the dependency data comprises decoded ready state data, active ready state data, and event data for respective instructions of the at least one of the event queues, and wherein the at least one of the event queues is coupled to the selector via a scheduler bank, the scheduler bank including ready logic for logically ORing at least a portion of the dependency data to produce an ORed version and then bitwise ANDing the ORed portion to determine whether the instruction is ready to issue.

14. The apparatus of claim 9, wherein the selector is coupled to at least one of the plurality of event queues via a scheduler bank and is further coupled to a different at least one of the plurality of event queues without an intervening scheduler bank.

15. The apparatus of claim 9, wherein:
a first one of the plurality of event queues stores dependency data for instructions associated with an even instruction identifier; and
a second one of the plurality of event queues stores dependency data for instructions associated with an odd instruction identifier.

* * * * *